(12) United States Patent
Mowery

(10) Patent No.: US 12,491,337 B2
(45) Date of Patent: Dec. 9, 2025

(54) VASCULAR ACCESS DEVICES FOR CATHETER INSERTION

(71) Applicant: Thomas Mowery, El Macero, CA (US)

(72) Inventor: Thomas Mowery, El Macero, CA (US)

(*) Notice: Subject to any disclaimer, the term of this patent is extended or adjusted under 35 U.S.C. 154(b) by 0 days.

(21) Appl. No.: 19/047,412

(22) Filed: Feb. 6, 2025

(65) Prior Publication Data
US 2025/0177693 A1 Jun. 5, 2025

Related U.S. Application Data

(63) Continuation of application No. 18/235,119, filed on Aug. 17, 2023, now abandoned.

(51) Int. Cl.
*A61M 25/00* (2006.01)
*A61B 5/00* (2006.01)

(52) U.S. Cl.
CPC ....... *A61M 25/0068* (2013.01); *A61B 5/0084* (2013.01)

(58) Field of Classification Search
CPC ...... A61M 2025/0086; A61M 25/0084; A61M 2025/0087; A61M 2025/0089; A61M 2025/009; A61M 2025/0091; A61M 2025/0092; A61M 25/0067; A61M 25/0068; A61M 25/0606; A61M 25/0041; A61M 25/0693; A61B 5/150106; A61B 5/150282; A61B 1/07; A61B 1/00163; A61B 1/00165; A61B 1/00167; A61B 1/0017; A61B 1/00174; A61B 1/06; A61B 1/0607; A61B 1/0615; A61B 1/0623; A61B 1/0625; A61B 1/0627; A61B 5/0084

USPC ........................................................ 604/249
See application file for complete search history.

(56) References Cited

U.S. PATENT DOCUMENTS

| | | | |
|---|---|---|---|
| 2,409,979 A | 10/1946 | Huber | |
| 2,697,438 A | 12/1954 | Hickey | |
| 3,090,384 A | 5/1963 | Baldwin et al. | |
| 3,308,822 A | 3/1967 | Luca | |

(Continued)

OTHER PUBLICATIONS

Steere et al., "Reaching One Peripheral Intravenous Catheter (PIVC) Per Patient Visit With Lean Multimodal Strategy: the PIV5Rights Bundle," Journal of the Assoc. for Vascular Access, vol. 24, Issue 3, Fall 2019.

(Continued)

*Primary Examiner* — Kevin C Sirmons
*Assistant Examiner* — William R Frehe
(74) *Attorney, Agent, or Firm* — Dale C. Barr; Constellation Law Group PLLC

(57) ABSTRACT

Techniques and technologies for vascular access devices are disclosed. A representative vascular access device includes an introducer having a shaft that includes a tip, a first aperture disposed proximate to the tip, a second aperture spaced apart from the tip, and an optical fiber disposed within the shaft that conveys light for emission from the first and second apertures. A catheter is disposed about the introducer and has a catheter distal end positioned between the first and second apertures. As the tip is advanced into the blood vessel, light emitted through the first aperture is diminished, indicating that the tip has entered the blood vessel. When light emitted through the second aperture is diminished, the practitioner knows that the catheter distal end has entered the blood vessel.

20 Claims, 18 Drawing Sheets

(56) References Cited

U.S. PATENT DOCUMENTS

| | | | |
|---|---|---|---|
| 4,525,157 | A | 6/1985 | Vaillancourt |
| 5,352,205 | A | 10/1994 | Dales et al. |
| 5,653,724 | A | 8/1997 | Imonti |
| 5,968,022 | A | 10/1999 | Saito |
| 6,440,119 | B1 | 8/2002 | Nakada et al. |
| 6,475,139 | B1 | 11/2002 | Miller |
| 7,070,556 | B2 | 7/2006 | Anderson et al. |
| 8,486,023 | B2 | 7/2013 | Pyles |
| 9,399,112 | B2 | 7/2016 | Shevgoor et al. |
| 10,166,364 | B2 | 1/2019 | Adams et al. |
| 10,349,975 | B2 | 7/2019 | Haselby et al. |
| 10,799,680 | B2 | 10/2020 | Belson |
| 10,828,465 | B2 | 11/2020 | Keyser et al. |
| 11,020,538 | B2 | 6/2021 | Tutttle |
| 11,564,735 | B2 | 1/2023 | Placek et al. |
| 11,607,205 | B2 | 3/2023 | Larson et al. |
| 12,109,374 | B2 | 10/2024 | Isaacson et al. |
| 2002/0005280 | A1 | 1/2002 | Wittig et al. |
| 2006/0276759 | A1 | 12/2006 | Kinast et al. |
| 2007/0005018 | A1 | 1/2007 | Tekbuchava |
| 2007/0198043 | A1 | 8/2007 | Cox et al. |
| 2007/0239939 | A1 | 10/2007 | Gerbi et al. |
| 2008/0154217 | A1 | 6/2008 | Carrez et al. |
| 2010/0249750 | A1 | 9/2010 | Racz |
| 2010/0324503 | A1 | 12/2010 | McKinnon et al. |
| 2011/0230846 | A1 | 9/2011 | Wen |
| 2011/0301642 | A1 | 12/2011 | White et al. |
| 2014/0276586 | A1 | 9/2014 | Swaney et al. |
| 2016/0074597 | A1 | 3/2016 | Mather et al. |
| 2016/0278694 | A1* | 9/2016 | Aharoni ............... A61B 5/6848 |
| 2017/0100141 | A1 | 4/2017 | Morero et al. |
| 2017/0143950 | A1 | 5/2017 | Koch et al. |
| 2018/0153579 | A1 | 6/2018 | Ueda |
| 2019/0038876 | A1 | 2/2019 | Isaacson et al. |
| 2019/0200976 | A1 | 7/2019 | Kumar et al. |
| 2020/0187934 | A1 | 6/2020 | Kelly et al. |
| 2021/0038216 | A1 | 2/2021 | Souls et al. |
| 2021/0121055 | A1 | 4/2021 | Motai |
| 2023/0000515 | A1 | 1/2023 | Pollack et al. |
| 2023/0034291 | A1 | 2/2023 | Panjeton et al. |

OTHER PUBLICATIONS

Piper et al., "The Mechanistic Causes of Peripheral Intravenous Catheter Failure Based on a Parametric Computational Study," Nature—Scientific Reports 8, Article No. 3441, Feb. 21, 2018.

OSD Staff, "Ideas That Work: Why Its Not Good to Bend IV Catheters," Outpatient Surgery Magazine, https://www.aorn.org/outpatient-surgery/article/2015-February-ideas-that-work-why-its-not-good-to-bend-iv-catheters, Feb. 4, 2015.

Lin, "Trick of the Trade: Bend the angle of the angiocatheter," Academic Life in Emergency Medicine, https://www.aliem.com/trick-of-trade-bend-iv-angiocatheter/, May 8, 2012.

Taylor, "Needle Point: Give Your IV Needles a Slight Bend," Outpatient Surgery Magazine, https://www.aorn.org/outpatient-surgery/article/2014-December-ideas-that-work-needle-point, Dec. 2, 2014.

Bowen, "Huber-point needle," https://litfl.com/huber-point-needle/, Dec. 5, 2021.

Frolich, "Pioneers in Epidural Needle Design," Anesthesia & Analgesia, 93(1):p. 215-220, Jul. 2001.

Yamakawa et al., "Development of an Implantable Flexible Probe for Simultaneous Near-Infrared Spectroscopy and Electrocorticography," IEEE Trans Biomed Eng; Feb. 2014; 61(2):388-95, Abstract.

Becton, Dickinson and Company, "BD Insyte Autoguard Shielded IV Catheter," https://www.bd.com/documents/in-service-materials/infusion/MPS_VA_Insyte-Autoguard-points-to-practice_IM_EN.pdf, 2019.

Rivera et al., "The history of peripheral intravenous catheters: how little plastic tubes revolutionized medicine." Acta Anaesthesiol Belg. 2005:56(3). 271-282, Feb. 2005.

3M, Inc., "Making peripheral lines a central focus: A clinical evidence summary," https://multimedia.3m.com/mws/media/2278704O/3m-clinical-evidence-summary-for-pivc.pdf. 2022.

Tesfamariam et al., "Endothelial injury in the initiation and progression of vascular disorders—Abstract," Vascul Pharmacol. 46(4):229-37, Apr. 2007.

Liang et al., "The use of a Colapinto TIPS Needle under cone-beam computed tomography guidance for true lumen re-entry in subintimal recanalization of chronic iliac artery occlusion," Journal of the Chinese Medical Association vol. 80, Issue 6, pp. 371-375, Jun. 2017.

Gajera et al., "Seldinger Technique," Radiopaedia.org, https://radiopaedia.org/articles/seldinger-technique Dec. 10, 2017.

Ho et al., "Improving the success rate of intravenous cannulation," Brazilian Journal of Anesthesiology, 2022;72(6): pp. 832-833. Jun. 1, 2022.

* cited by examiner

VASCULAR ACCESS DEVICES FOR CATHETER INSERTION

CROSS REFERENCE TO RELATED APPLICATIONS

This patent application claims priority to the following co-pending, non-provisional patent application: U.S. patent application Ser. No. 18/235,119 filed on Aug. 17, 2023, which application is incorporated herein by reference.

FIELD OF THE DISCLOSURE

The present disclosure relates generally to techniques and technologies for vascular access devices for improved introduction of catheters into vasculatures and the like.

BACKGROUND

Many medical procedures typically involve the insertion of a catheter into a vasculature or other lumen of the patient's body, such as for the administration of medication or the collection of blood samples. For example, FIG. 1 shows a side elevational view of a vascular access device 50 for performing a catheter insertion in accordance with the prior art. The vascular access device 50 represents a common, commercially-available device used for performing medical procedures, including peripheral intra venous cannulation (PIVC). The vascular access device 50 includes a needle 52 having an elongated straight shaft 54 that includes a beveled tip 56 that is used to puncture the skin of a patient. The straight shaft 54 defines a cylindrical, hollow passage 75 (FIG. 2) through which fluids are able to flow. The needle 52 is coupled to a needle hub 58 which is, in turn, coupled to a retraction cover 60 which serves as a handle for a medical practitioner to hold while manipulating the vascular access device 50. As further shown in FIG. 1, a catheter 62 is positioned over a portion of the straight shaft 54 of the needle 52, and is coupled to a catheter hub 64 which is removably coupled to the needle hub 58. The catheter 62 is slidably engaged onto the straight shaft 54 of the needle 52 with a distal end 68 of the catheter 62 positioned proximate to the tip 56 of the needle 52. A blood flashback viewing aperture 66 opens in the proximal side of the straight shaft 54 at a relatively small distance away from the tip 56, which is typically visible to the medical practitioner through the transparent catheter 62.

In operation, a medical practitioner may grasp the retraction cover 60 and may manipulate the vascular access device 50 to insert the tip 56 of the needle 52 through a patient's skin and into a vasculature (e.g. vein). Because the needle 52 includes a hollow passage 75 through which fluids are able to flow, the viewing flashback aperture 66 provides visibility for the medical practitioner to see an appearance of blood (or "blood flash") within the needle 52 after the tip 56 successfully penetrates a proximal wall of the vasculature. The medical practitioner may then continue to advance the vascular access device 50 further into the vasculature until the distal end 68 of the catheter 62 is also inserted through the proximal wall of the vasculature. If blood does not appear within the viewing aperture 66, the medical practitioner may withdraw the tip 56 of the needle 52, reposition the vascular access device 50, and advance the tip 56 again until successful penetration of the vasculature is achieved. With the distal end 68 of the catheter 62 inserted within the vasculature, the medical practitioner may separate the needle hub 58 from the catheter hub 64, and may advance the catheter 62 along the straight shaft 54 so that the distal end 68 of the catheter 62 is pushed beyond the tip 56 of the needle 52 to typically advance against the distal wall and lie proximate to the vasculature distal wall. The medical practitioner may then separate the needle hub 58 from the catheter hub 64, withdrawing the needle 52 from the vasculature and from the catheter 62. Accordingly, with the distal end 68 of the catheter 62 remains inserted into the vasculature with the catheter hub 64 located external to the patient's skin so that the medical practitioner may attach other devices to the catheter hub 64 in order to perform a desired medical procedure, such as administration of a fluid or medicine into the vasculature, or the withdrawal of a sample from the vasculature for analysis.

The medical practitioner may also manipulate the vascular access device 50 so that the needle 52 is retracted into the retraction cover 60 as a safety precaution to prevent inadvertent exposure or contact with the tip 56 of the needle 52. Manufacturers of vascular access devices (e.g. vascular access device 50) routinely caution and instruct medical practitioners not to bend the shaft 54 of the needle 52 in order to avoid interfering with the retraction safety feature on grounds that if the shaft 54 of the needle 52 is not straight it will interfere with retraction into the retraction cover 60 and disable the safety feature of the vascular access device 50. (see, e.g., "BD Insyte Autoguard—Points to Practice" published by Becton Dickinson at worldwide web address bd.com/documents/in-service-materials/infusion/MPS_ VA_Insyte-Autoguard-points-to-practice_IM_EN.pdf, © 2019). Additionally, the professional standards of practice teaches to not bend the shaft 54 to avoid, for example, kinking, occlusion, or breakage of the shaft 54 within the vasculature, as well as to avoid injury to the medical practitioner.

It will be appreciated that during the above-noted procedure, the medical practitioner typically attempts to avoid advancing the tip 56 of the needle 52 through the distal wall of the vasculature, although contact by the tip 56 of the needle 52 (and by the distal end 68 of the catheter 62) with the distal wall of the vasculature is not unusual. To attempt to mitigate possible damage to the endothelial layer of the distal wall of the vasculature, the tip 56 of the needle 52 may be slightly rounded or blunted. For example, FIG. 2 shows a portion of the needle 52 of the vascular access device 50 of FIG. 1, in which the shaft 54 of the needle 52 is a straight cylindrical shape having a hollow interior passage 75 that is centered about a longitudinal axis 55. The distal end 68 of the catheter 62 is represented in dashed lines to show a typical position of the distal end 68 of the catheter 62 on the shaft 54. As shown in FIG. 2, the tip 56 of the needle 52 may have a bevel 70 that is upwardly facing, and angled obliquely to the longitudinal axis 55, creating a sharp, cutting edge for the tip 56 to penetrate the skin and other tissues of the patient. Across from the bevel 70, on the opposite side of the tip 56, the tip 56 includes a rounded lower surface 72. The rounded lower surface 72 of the tip 56 curves away from and remains within a cylindrical outer boundary 74 (represented by dashed lines) that extends beyond the tip 56 of the needle 52 and that represents an imaginary extension of the straight, cylindrical shaft 54 of the needle 52. Although the tip 56 includes a rounded lower surface 72, the hollow interior passage 75 of the needle 52 remains a straight cylinder disposed about the straight longitudinal axis 55. Accordingly, when the medical practitioner advances the tip 56 of the needle 52 into the distal wall of the vasculature (or other lumen), the rounded lower surface 70 of the tip 56 may impinge the distal wall as a relatively blunt surface on the distal wall.

Although desirable results have been achieved, it will be appreciated that the vascular access device 50 and above-noted medical procedure have an imperfect success rate even among experienced medical practitioners. Accordingly, techniques and technologies that may improve these procedures, and that may reduce vasculature wall endothelial as well as subcutaneous tissue damage or irritation due to insertions of a catheter into a patient's body, would have substantial utility.

SUMMARY

The present disclosure teaches techniques and technologies for vascular access devices having a curved introducer for improved introduction of catheters into vasculatures and the like.

For example, in some embodiments, a vascular access device includes a curved introducer having a shaft that includes a tip disposed at a distal end of the shaft, the tip configured to penetrate at least a proximal wall of a blood vessel of a patient. The shaft may have a straight section and a curved section disposed between the straight section and the tip. The curved section may be configured to provide a curvature between the straight section and the tip such that a tip longitudinal axis that extends from the tip forms an introducer angle with a straight longitudinal axis of the straight section. In some embodiments, the introducer angle is configured to at least partially reduce contact by the tip (and in some cases a distal end of a catheter) with a distal wall of the blood vessel after the tip has been inserted through the proximal wall of the blood vessel.

Similarly, in some embodiments, a vascular access device configured for introduction of a catheter into a blood vessel of a patient, comprises: a housing; and an introducer hub operatively coupled to the housing and to a curved introducer, the curved introducer having a shaft that includes a tip disposed at a distal end of the shaft, the tip configured to penetrate at least a proximal wall of the blood vessel of the patient, the shaft having a straight section and a curved section disposed between the straight section and the tip, the curved section being configured to provide a curvature between the straight section and the tip such that a tip longitudinal axis that extends from the tip forms an introducer angle with a straight longitudinal axis of the straight section, the introducer angle being configured to at least partially reduce contact by the tip with a distal wall of the blood vessel after the tip has been inserted through the proximal wall of the blood vessel.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

This summary is intended to provide an introduction of a few exemplary aspects of implementations in accordance with the present disclosure. It is not intended to provide an exhaustive explanation of all possible implementations, and should thus be construed as merely introductory, rather than limiting, of the following disclosure.

DETAILED DESCRIPTION

Techniques and technologies for vascular access devices having a curved introducer will now be disclosed. In the following description, many specific details of certain implementations are described and shown in the accompanying figures. One skilled in the art will understand that the present disclosure may have other possible implementations, and that such other implementations may be practiced with or without some of the particular details set forth in the following description.

For example, in some embodiments, a vascular access device includes a curved introducer having a shaft that includes a tip disposed at a distal end of the shaft, the tip configured to penetrate at least a proximal wall of a blood vessel of a patient. In some embodiments, the shaft has a straight section and a curved section disposed between the straight section and the tip. The curved section may be configured to provide a curvature between the straight section and the tip such that a tip longitudinal axis that extends from the tip forms an introducer angle with a straight longitudinal axis of the straight section. In some embodiments, the introducer angle is configured to at least partially reduce contact by the tip (and in some cases a distal end of a catheter) with a distal wall of the blood vessel after the tip has been inserted through the proximal wall of the blood vessel.

Figure 3A:
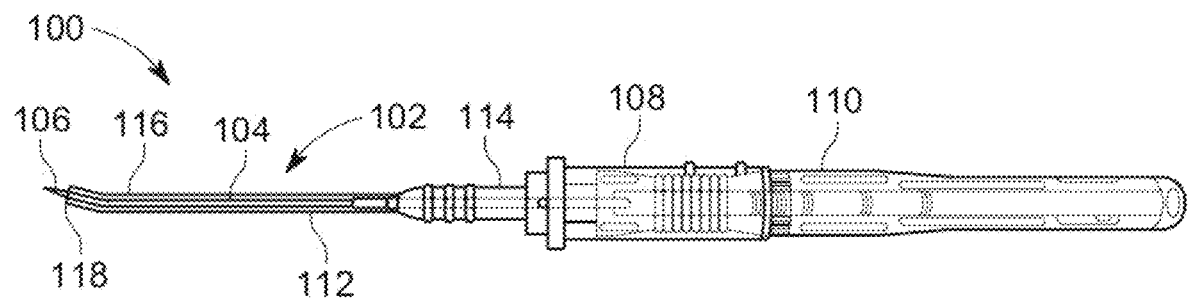
FIG. 3A shows a side elevational view of a vascular access device having a curved introducer for performing a catheter insertion in accordance with an embodiment of the present disclosure.
Figure 4:
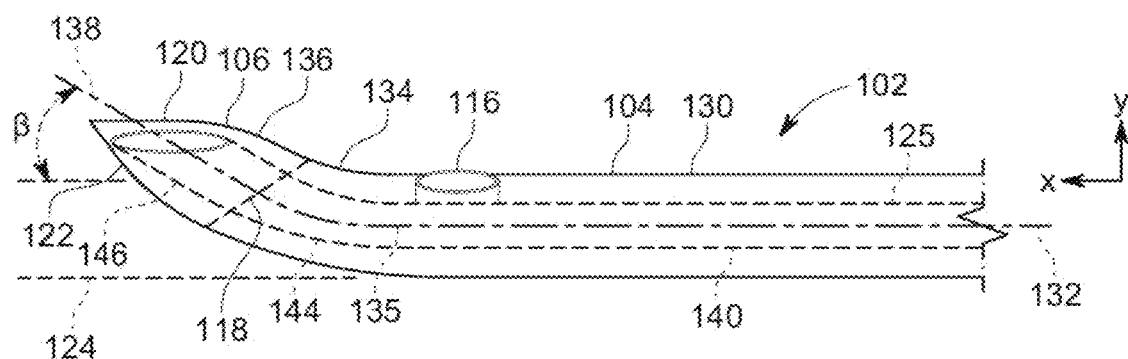
FIG. 4 shows an enlarged, side elevational view of a portion of the curved introducer of the vascular access device of FIG. 3A in accordance with an embodiment of the present disclosure.
Figure 5:
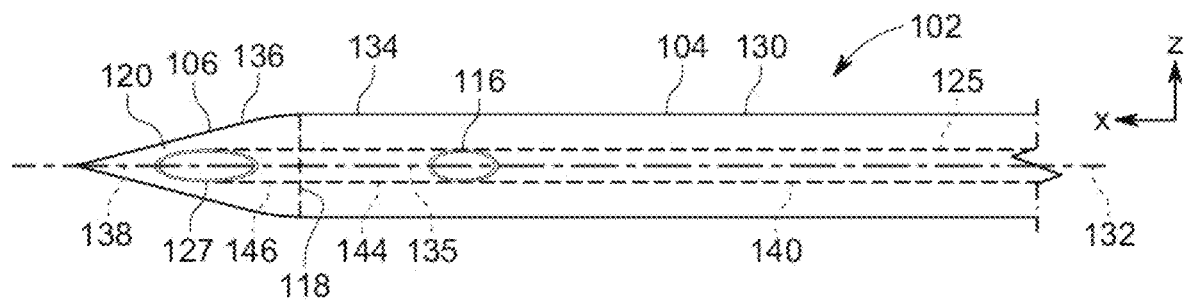
FIG. 5 shows a top elevational view of the portion of the curved introducer of the vascular access device of FIG. 4 in accordance with an embodiment of the present disclosure.

FIG. 3A shows a side elevational view of a vascular access device 100 having a curved introducer 102 for performing a catheter insertion in accordance with an embodiment of the present disclosure. FIGS. 4 and 5 are enlarged side and top elevational views of a portion of the curved introducer 102 of FIG. 3A. In some embodiments, the curved introducer 102 includes an elongated shaft 104 having a tip 106 that is used to puncture the skin of the patient and to penetrate other tissues of the patient, including a proximal wall of a vasculature, as described more fully below.

As best shown in FIGS. 4-5, in some embodiments, the shaft 104 of the curved introducer 102 include a proximal shaft section 130 that is disposed about a proximal longitudinal axis 132, an intermediate shaft section 134 that is disposed about an intermediate longitudinal axis 135, and a distal shaft section 136 that is disposed about a distal longitudinal axis 138. In some embodiments, the proximal shaft section 130 is a straight cylindrical section, and the proximal longitudinal axis 132 is a straight axis. In some embodiments, the intermediate shaft section 134 is a curved cylindrical section, and the intermediate longitudinal axis 135 is a curved axis (e.g. in an x-y plane). And in some embodiments, the distal shaft section 136 is a straight cylindrical section, and the distal longitudinal axis 138 is also a straight axis. It will be appreciated that the distal longitudinal axis 138 of the curved introducer 102 is not co-linear with the proximal longitudinal axis 132, and that due to the curvature of the curved shaft section 134 (visible in FIG. 4), the distal longitudinal axis 138 is disposed at an introducer angle β with respect to the proximal longitudinal axis 132 (e.g. in the x-y plane). For example, in some embodiments, the introducer angle β may have a value within a range of approximately 5 degrees to approximately 50 degrees. More specifically, in some embodiments, the introducer angle β may have a value of approximately 30 degrees.

As further shown in FIG. 4, the distal shaft section 136 includes the tip 106 of the curved introducer 102. In some embodiments, the tip 106 may have a beveled surface 120 (see FIGS. 4-5) that is generally (or approximately) upwardly facing, and angled obliquely to the distal longitudinal axis 138, creating a sharp, cutting edge for the tip 106 to penetrate the skin and other tissues of the patient. And in some embodiments, the tip 106 includes a rounded lower surface 122 positioned across from the bevel 120 on the opposite (or downwardly facing) side of the tip 106. In some embodiments, the curvature of the intermediate shaft section 134 results in the tip 106 of the shaft 104 to extend beyond a cylindrical outer boundary 124 (represented by dashed lines) that represents an imaginary extension of the straight, proximal shaft section 130 of the shaft 104 of the curved introducer 102.

It will be appreciated that the relative lengths of the proximal shaft section 130, intermediate shaft section 134, and distal shaft section 136 may vary from that shown in FIGS. 4-5. For example, in some embodiments, the curved intermediate shaft section 134 may be longer or shorter than the embodiment shown in FIGS. 4-5. In some embodiments, the curved intermediate shaft section 134 may be disposed at any desired location along the entire length of the curved introducer 102. Alternately, in some embodiments, the curved intermediate shaft section 134 may be positioned (or occur) anywhere within the distal half of the length of the curved introducer 102 (i.e. distal half that includes the tip 106). In some embodiments, the curved intermediate shaft section 134 may be positioned (or occur) anywhere within the distal 30% of the length of the curved introducer 102 (i.e. distal 30% that includes the tip 106). And in some embodiments, the curved intermediate shaft section 134 may be disposed anywhere along the shaft 104 between the tip 106 and the blood flashback aperture 116. And in some embodiments, the distal shaft section 136 may be eliminated, and the tip 106 may be part of the curved intermediate shaft section 134.

In some embodiments, the shaft 104 of the curved introducer 102 defines a hollow passage 125 (FIG. 4) through which fluids are able to flow. More specifically, in some embodiments, the hollow passage 125 extends throughout the entire length of the curved introducer 102, from an entrance aperture formed in the shaft 104 proximate the introducer hub 108 to an exit aperture 127 formed within the tip 106 of the shaft 104.

As shown in FIGS. 4-5, in some embodiments, the hollow passage 125 of the curved introducer 102 may include a proximal passage section 140 that is disposed about the proximal longitudinal axis 132, an intermediate passage section 144 that is disposed about the intermediate longitudinal axis 135, and a distal passage section 146 that is disposed about the distal longitudinal axis 138. In some embodiments, the proximal passage section 140 of the hollow passage 125 is a straight cylindrical section. In some embodiments, the intermediate passage section 144 is a curved cylindrical section (e.g. in an x-y plane), and in some embodiments, the distal passage section 146 is also a straight cylindrical section. It will be appreciated that the distal passage section 146 of the curved introducer 102 is not co-linear with the proximal passage section 140, and that due to the curvature of the curved intermediate shaft section 134 (visible in FIG. 4), the distal passage section 146 is angled with with respect to the proximal passage section 140 by the introducer angle β (e.g. in the x-y plane).

Figure 3B:
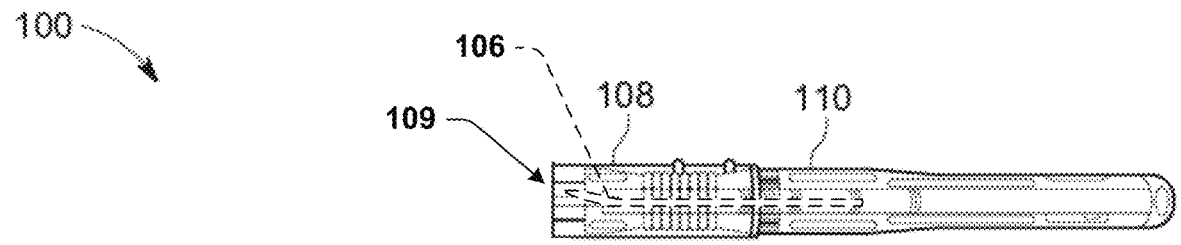
FIG. 3B shows a side elevational view of the vascular access device of FIG. 3A with a catheter and catheter hub removed and having a curved introducer retracted into a retraction cover and/or an introducer hub in accordance with an embodiment of the present disclosure.

As further shown in FIGS. 3-5, in some embodiments, the curved introducer 102 is coupled to an introducer hub 108 which is, in turn, coupled to a retraction cover 110 which serves as a handle for a medical practitioner to hold while manipulating the vascular access device 100. A catheter 112 may be positioned over a portion of the shaft 104 of the curved introducer 102, and coupled to a catheter hub 114 which is removably coupled to the introducer hub 108. In some embodiments, the catheter 112 may be a flexible, transparent sleeve that is slidably engaged over the shaft 104 of the curved introducer 102. The catheter 112 may include a distal end 118 that, in some embodiments, may be tapered to provide less resistance during insertion into a vasculature. The catheter 112 may be positioned onto the shaft 104 with the distal end 118 positioned proximate to the tip 106 of the of the curved introducer 102. A blood flashback aperture 116 is formed in the shaft 104 at a relatively small distance away from the tip 106 of the curved introducer 102, which enables blood be visible (i.e. blood flashback) to the medical practitioner. In some embodiments, the blood flashback aperture 116 may be positioned in the proximal section 130.

Figure 35:
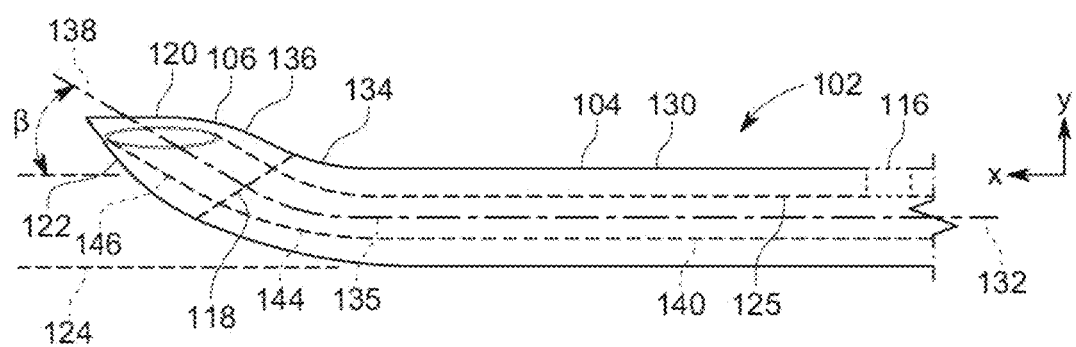
FIG. 35 shows an enlarged, side elevational view of a portion of the curved introducer of the vascular access device of FIG. 3A in accordance with another embodiment of the present disclosure.

It will be appreciated that the blood flashback aperture 116 may be positioned at any suitable location along the shaft 104 of the curved introducer 102. For example, in the embodiment shown in FIG. 4, the blood flashback aperture 116 is disposed within the straight, proximal shaft section 130 of the shaft 104, relatively near to the curved, intermediate shaft section 134. In some embodiments, the blood flashback aperture 116 may be located within the curved, intermediate shaft section 134 (e.g. see apertures 300, 330 of FIGS. 16-19). And in some embodiments, however, the blood flashback aperture 116 may be spaced apart from the curved, intermediate shaft section 134. For example, FIG. 35 shows an enlarged, side elevational view of a portion of the curved introducer 102 of the vascular access device 100 of FIG. 3A in accordance with another embodiment of the present disclosure. In this embodiment, the blood flashback aperture 116 is disposed within the straight, proximal shaft section 130 of the shaft 104, but is now positioned relatively closer to the introducer hub 108 and spaced apart from the curved, intermediate shaft section 134. In some embodiments, the blood flashback aperture 116 may be positioned within an initial 30% of the straight, proximal shaft section 130 of the shaft 104 that is closest to the introducer hub 108. In such embodiments, by moving the blood flashback aperture 116 relatively further away from the curved, intermediate shaft section 134, the structural integrity and rigidity of the shaft 104 may be improved, and the possibility of inadvertent bending or breakage of the shaft 104 may be reduced in comparison with other possible embodiments.

In operation, a medical practitioner may grasp the retraction cover 110 and may manipulate the vascular access device 100 to insert the tip 106 of the curved introducer 102 through a patient's skin and into a vasculature (e.g. vein). Because the curved introducer 102 includes the hollow passage 125 through which fluids are able to flow, the blood flashback aperture 116 provides visibility for the medical practitioner to see an appearance of blood (or "blood flashback") within the proximal section 130 of the curved introducer 102 after the tip 106 successfully penetrates a proximal wall of the vasculature. The medical practitioner may then continue to advance the vascular access device 100 further into the vasculature until the distal end 118 of the catheter 112 is also inserted through the proximal wall of the vasculature. If blood does not appear within the viewing aperture 116, the medical practitioner may withdraw the tip 106 of the curved introducer 102, reposition the vascular access device 100, and advance the tip 106 again until successful penetration of the vasculature is achieved. With the distal end 118 of the catheter 112 inserted within the vasculature, the medical practitioner may separate the introducer hub 108 from the catheter hub 114, and may advance the catheter 112 along the shaft 104 so that the distal end 118 of the catheter 112 is pushed beyond the tip 106 of the curved introducer 102 and into a desired, relatively centrally and axially aligned position within the vasculature rather than along the vasculature wall. The medical practitioner may then separate the introducer hub 108 from the catheter hub 114, withdrawing the curved introducer 102 from the vasculature and from the catheter 112. Accordingly, with the distal end 118 of the catheter 112 remains inserted into the vasculature with the catheter hub 114 located external to the patient's skin so that the medical practitioner may attach other devices to the catheter hub 114 in order to perform a desired medical procedure, such as administration of a fluid or medicine into the vasculature, or the withdrawal of a sample from the vasculature for analysis.

Additionally, and in contrast to conventional wisdom, the medical practitioner may manipulate the vascular access device 100 so that the curved introducer 102 is retracted into the retraction cover 110 as a safety precaution to prevent inadvertent exposure or contact with the tip 56 of the curved introducer 102. This may be accomplished by proper design of the retraction cover 110 and/or the introducer hub 108, such as by providing an enlarged aperture or other suitable design features that permit the curved portion(s) of the curved introducer 102 to be withdrawn into the retraction cover 110 and/or the introducer hub 108 (or that permits an alternative safety cover to be extended over the curved introducer 102) to substantially encapsulate the tip 106 of the curved introducer 102 following use of the vascular access device 100 (see FIG. 3B).

Figure 6:
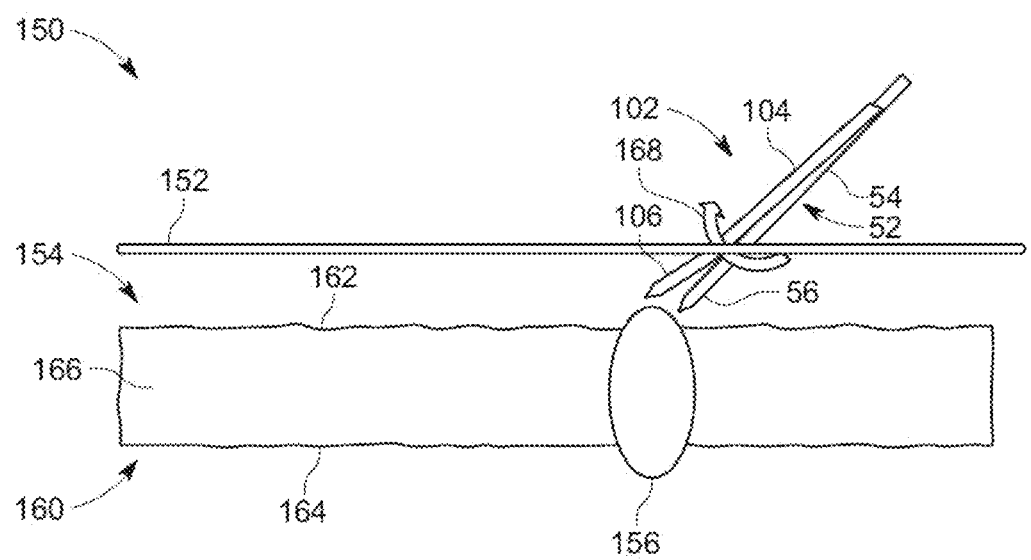
FIG. 6 shows a side cross-sectional view of a first operating environment of the vascular access device of FIGS. 3A-5 in accordance with an embodiment of the present disclosure, and a comparison with the prior art vascular access device of FIGS. 1-2.

Various operational aspects of the vascular access device 100 that includes the curved introducer 102 in accordance with the present disclosure will now be described and compared with operational aspects of the prior art vascular access device 50 that includes the straight needle 52. For example, FIG. 6 shows a side cross-sectional view of a first operating environment 150 of the vascular access device 100 of FIGS. 3A-5, and a comparison with the prior art vascular access device 50 of FIGS. 1-2. In this embodiment, the first operating environment 150 includes a blood vessel 160 that is disposed beneath a skin surface 152 and a subcutaneous tissue 154 of a patient. The blood vessel 160 includes a proximal wall 162 that is closer to the skin surface 152, and a distal wall 164 that is farther from the skin surface 152. The proximal and distal walls 162, 164 surround a vessel lumen 166 of the blood vessel 160 in which the blood of the patient flows. In most operating conditions, there will not be any impediments to access the blood vessel 160, however, in the first operating environment 150 shown in FIG. 6, a bone 156 is also disposed beneath the skin surface 152 proximate to the blood vessel 160 as a potential impediment.

In operation, a medical practitioner may advance the straight needle 52 of the vascular access device 50 into the skin surface 152 in an attempt to insert the tip 56 of the needle 52 into the blood vessel 160, whereupon the tip 56 may strike the bone 156. The bone 156 prevents the tip 56 from advancing through the proximal wall 162 and entering the vessel lumen 166 of the blood vessel 160. The goal of the medical practitioner is to access the vessel lumen 166 on the first attempt without contacting the distal wall 164 of the blood vessel 160. Using the prior art vascular access device 50, when the tip 56 of the needle 52 strikes the bone 156, the medical practitioner must withdraw the needle 52, change the angle of the needle 52 relative to the skin surface 152, and then make another attempt to advance the tip 56 of the needle 52 to avoid the bone 156 and to access the blood vessel 160.

On the other hand, using the vascular access device 100 having the curved introducer 102, the medical practitioner may advance the tip 106 of the curved introducer 102 through the skin surface 152, and upon striking the bone 156 (or other impediment), in some embodiments, the medical practitioner may then withdraw just slightly away from the bone 156 and then to rotate the curved introducer 102 (indicated by arrow 168) in order to allow the tip 106 to miss the bone 156. The medical practitioner may then continue to advance the tip 106 of the curved introducer 102 until the tip 106 penetrates the proximal wall 162 of the blood vessel 160 (as indicated by the blood in the blood flashback aperture 116). Therefore, in some embodiments, it will be appreciated that the avoidance of the impediment (e.g. the bone 156) may be accomplished by the medical practitioner in a more advantageous manner using the vascular access device 100 having the curved introducer 102 in comparison with the vascular access device 50 having the straight needle 52, which would require the medical practitioner to pull back further to change directions and probe further in the subcutaneous tissue 154.

Figure 1:
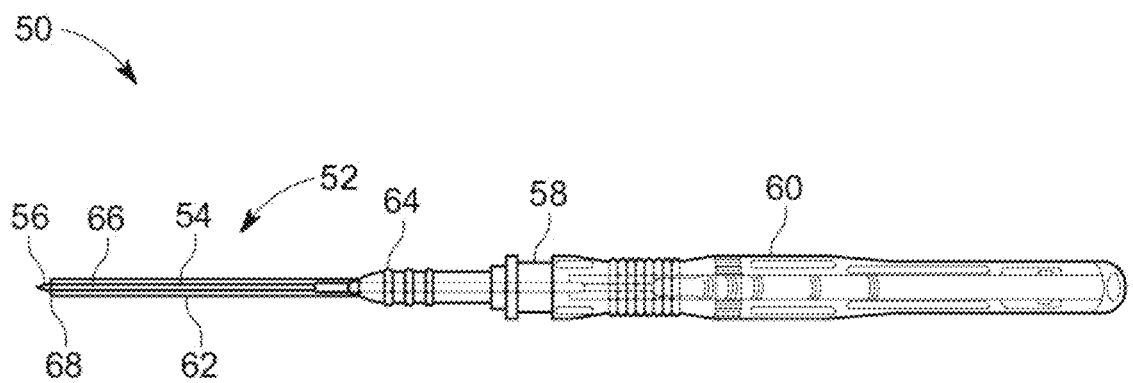
FIG. 1 shows a side elevational view of a vascular access device for performing a catheter insertion in accordance with the prior art.
Figure 2:
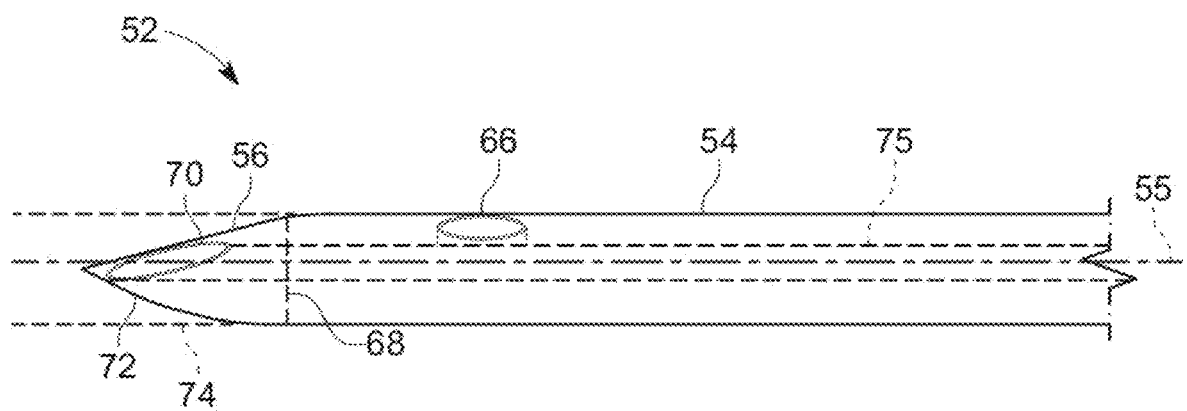
FIG. 2 shows an enlarged, side elevational view of a portion of a needle of the vascular access device of FIG. 1 in accordance with the prior art.
Figure 7:
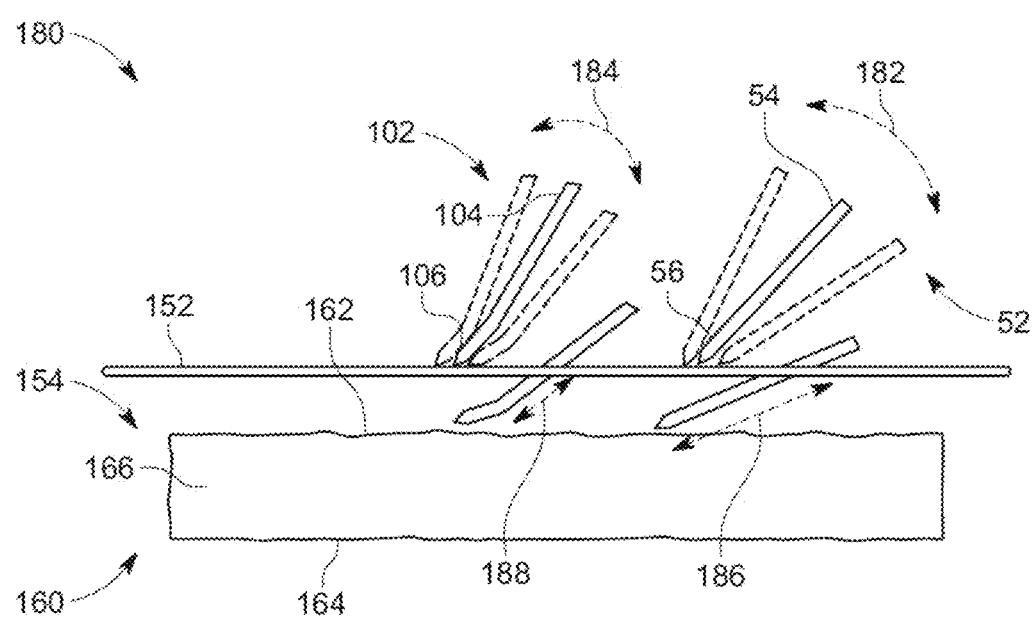
FIG. 7 shows a side cross-sectional view of a second operating environment of the vascular access device of FIGS. 3A-5 in accordance with an embodiment of the present disclosure, and a comparison with the prior art vascular access device of FIGS. 1-2.

FIG. 7 shows a side cross-sectional view of a second operating environment 180 of the vascular access device 100 of FIGS. 3A-5 and a comparison with the prior art vascular access device 50 of FIGS. 1-2. In this embodiment, the second operating environment 180 includes several of the same structures as the first operating environment 150 described above. The second operating environment 180 includes a first representative range 182 of insertion angles of the straight needle 52 of the prior art vascular access device 50 of FIGS. 1-2. The first representative range 182 visually indicates that the needle 52 having the straight shaft 54 is usually introduced to the skin surface 152 between approximately 30 to 45 degrees at the discretion of the medical practitioner, depending on one or more variables of the second operating environment (e.g. anatomical challenges, etc.).

The second operating environment 180 also includes a second representative range 184 of insertion angles of the curved introducer 102 of the vascular access device 100 of FIGS. 3A-5. In some embodiments, to achieve an angle of insertion at the skin surface 152 that is comparable to the needle 52 having the straight shaft 54, the curved introducer 102 having the curved shaft 104 can perform in a relatively narrower range of angles (the second representative range 184) compared with the range of angles of the prior art vascular access device 50 (the first representative range 182), which may approximately correspond to the angle of the curve of the curved introducer 102 (i.e. the introducer angle β). This can be beneficial to the medical practitioner in a variety of circumstances and environments, such as in constrictive anatomy.

As further shown in FIG. 7, after the skin surface 152 is pierced, the medical practitioner generally lays the shaft 54 of the needle 52 of the prior art vascular access device 50 down to a relatively lower angle proximate to the skin surface 152 (e.g. 15-20 degrees) and probes the tip 56 of the needle 52 forwardly through the subcutaneous tissue 154 by a first distance 186 to find the blood vessel 160. Similarly, using the vascular access device 100 having the curved introducer 102, the medical practitioner penetrates the skin surface 152 with the tip 106 and advances the curved introducer 102 through the subcutaneous tissue 154 by a second distance 188 until the tip 106 reaches the blood vessel 160. As depicted in FIG. 7, in some embodiments, the first distance 186 may be greater than the second distance 188, demonstrating that the tip 56 of the straight needle 52 must probe further through the tissues of the patient than the tip 106 of the curved introducer 102 having the curved shaft 104 to reach the blood vessel 160 with each retraction and reinsertion.

Figure 8:
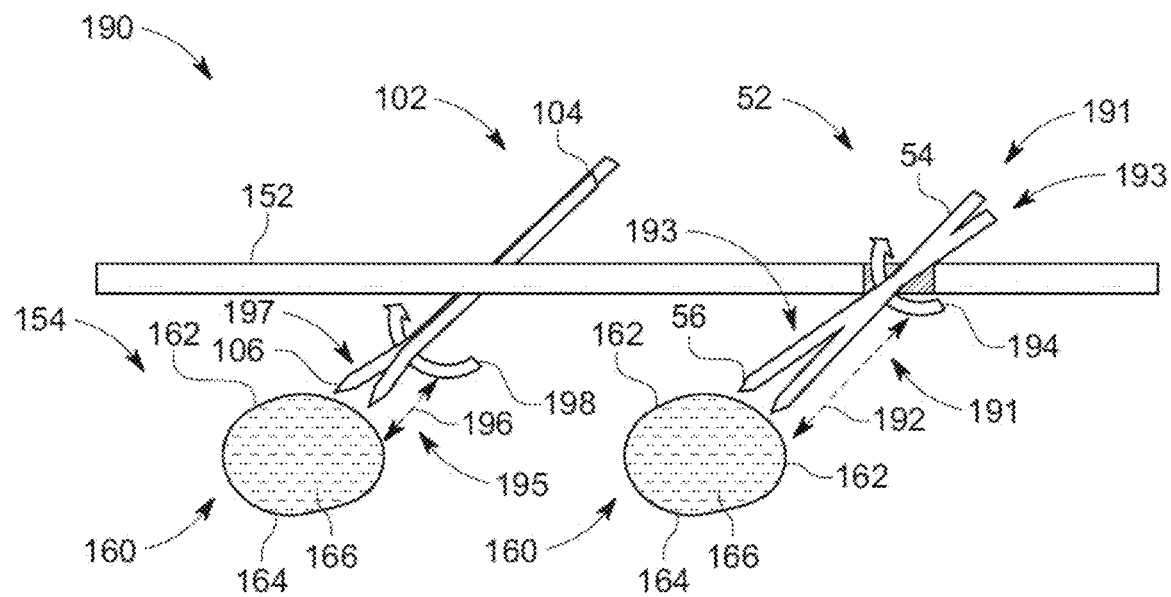
FIG. 8 shows an end cross-sectional view of a third operating environment of the vascular access device of FIGS. 3A-5 in accordance with an embodiment of the present disclosure, and a comparison with the prior art vascular access device of FIGS. 1-2.

FIG. 8 shows an end cross-sectional view of a third operating environment 190 of the vascular access device 100 of FIGS. 3A-5 and a comparison with the prior art vascular access device 50 of FIGS. 1-2. As shown in FIG. 8, the medical practitioner may position the needle 52 of the prior art vascular access device 50 in a first position 191 and may advance the tip 56 of the straight needle 52 toward the blood vessel 160 in an attempt to penetrate the proximal wall 162. If this attempt is unsuccessful, the medical practitioner may withdraw the tip 56 by a third distance 192, pivot the needle 52 (indicated by arrow 194) of the prior art vascular access device 50 into a second position 193, and then advance the tip 56 of the straight needle 52 toward the blood vessel 160 in another attempt to penetrate the proximal wall 162.

As further shown in FIG. 8, the medical practitioner may position the curved introducer 102 of the vascular access device 100 of FIGS. 3A-5 in a first position 195 and may advance the tip 106 of the curved introducer 102 toward the blood vessel 160 in an attempt to penetrate the proximal wall 162. If this attempt is unsuccessful, the medical practitioner may withdraw the tip 106 by a fourth distance 196, rotate the shaft 104 (indicated by arrow 198) to reposition the tip 106 into a second position 197, and then advance the tip 106 of the curved introducer 102 toward the blood vessel 160 in another attempt to penetrate the proximal wall 162.

It will be appreciated that FIG. 8 demonstrates that, in some embodiments, the prior art vascular access device 50 having the straight needle 52 must be pulled back further (i.e. third distance 192) than does the curved introducer 102 of the vascular access device 100 (i.e. fourth distance 196) in order to pivot to a new position. The relatively greater retractions needed by the prior art vascular access device 50 cause more tissue trauma and pain and can be less precise in finding the blood vessel 160. In some embodiments, the curved introducer 102 may be rotated with less retraction and thus is easier to redirect to access the blood vessel 160 in a more radial (perpendicular) direction to the center of the vessel lumen 166 which has the longest diameter measurement. Moreover, this more radial angle may advantageously reduce the risk of endothelium impact and damage of the distal wall 164 of the blood vessel 160 since the medical practitioner has a greater chance of halting the advance of the tip 106 prior to impacting the distal wall 164. Thus, the curved introducer 102 of the vascular access device 100 in accordance with the present disclosure is more likely to access the blood vessel 160 with fewer attempts and less trauma to the patient in comparison with the straight needle 52 of the prior art vascular access device 50.

Figure 9:
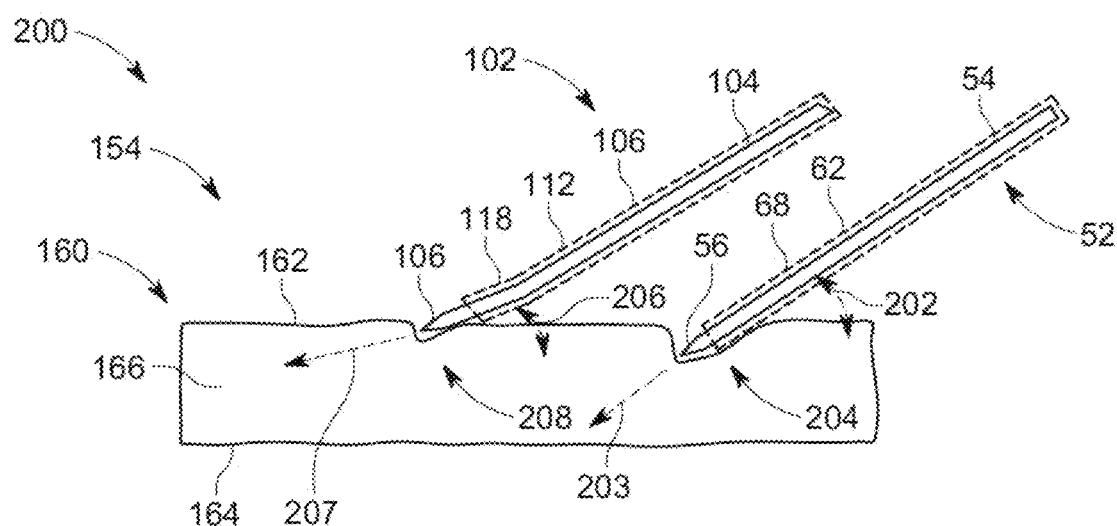
FIGS. 9-11B show side cross-sectional views of a third operating environment of the vascular access device of FIGS. 3A-5 in accordance with an embodiment of the present disclosure, and a comparison with the prior art vascular access device of FIGS. 1-2.

FIGS. 9-11B show side cross-sectional views of a third operating environment 200 of the vascular access device 100 of FIGS. 3A-5, and a comparison with the prior art vascular access device 50 of FIGS. 1-2. As shown in FIG. 9, at a first time during a medical procedure, the tip 56 of the needle 52 of the prior art vascular access device 50 begins to engage with the proximal wall 162 of the blood vessel 160 at a first incidence angle 202. As the tip 56 is advanced in a first direction 203 against the proximal wall 162 at the first incidence angle 202, the tip 56 attempts to penetrate the proximal wall 162, causing the proximal wall 162 to bend or depress inwardly into the vessel lumen 166 and forming a first distortion 204 in the proximal wall 162.

As further shown in FIG. 9, the tip 106 of the curved introducer 102 of the vascular access device 100 of FIGS. 3A-5 begins to engage with the proximal wall 162 of the blood vessel 160 at a second incidence angle 206. Due to the curvature of the curved introducer 102 (i.e. the introducer angle β), in some embodiments, the second incidence angle 206 is smaller than the first incidence angle 202 so that the tip 106 of the curved introducer 102 engages with the proximal wall 162 more obliquely and applying more force on the proximal wall 162 along an axial direction of the blood vessel 160. Accordingly, as the tip 106 of the curved introducer 102 is advanced in a second direction 207 against the proximal wall 162 at the second incidence angle 206, the tip 106 may cause the proximal wall 162 to bend or depress into the vessel lumen 166 and form a second distortion 208 in the proximal wall 162, however, due to the second incidence angle 206 being smaller than the first incidence angle 202, the second distortion 208 caused by the curved introducer 102 may be considerably smaller than the first distortion 204 caused by the straight needle 52. In addition, a greater incidence angle (or angle of entry) typically results in the tip 56 of the prior art straight needle 52 having a greater chance of impacting the distal wall 164 of the blood vessel 160 which increases the risk of endothelial damage, especially with the additional advancement, (e.g. 1-2 mm) after viewing blood in the blood flashback aperture 66, necessary to ensure that the distal end of the catheter 62 is in the vessel lumen 166 before being pushed off the shaft 54 of the needle 52.

Figure 10:
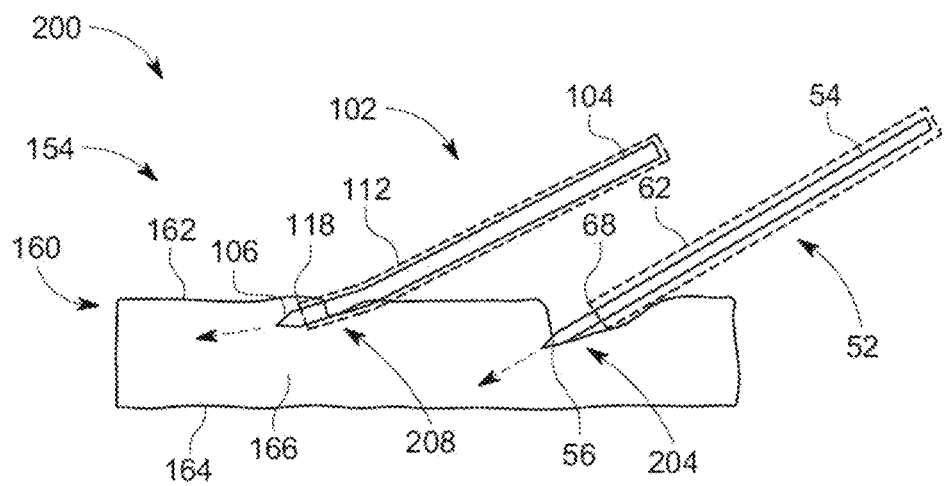

FIG. 10 shows the third operating environment 200 at a second time during the medical procedure, at which the tip 56 of the needle 52 of the prior art vascular access device 50 has penetrated the proximal wall 162 of the blood vessel 160. Due to the first distortion 204 of the proximal wall 162, the distal end 68 of the catheter 62 has not yet penetrated the proximal wall 162. At this point, the medical practitioner may see a blood in the blood flashback aperture 66 of the needle 52, and may fail to advance the prior art vascular access device 50 further into the blood vessel 160 to ensure that the distal end 68 is positioned within the vessel lumen 166. Thus, if the tip 56 of the needle 52 is in the vessel lumen 166, but not the distal end 68 of the catheter 62 as depicted in FIG. 10, the blood flashback may encourage the medical practitioner to err by attempting to push the catheter 62 along the shaft 54 of the needle 52 to advance the distal end 68 into the vessel lumen 166, which may cause the distal end 68 of the catheter 62 to push the proximal wall 162 further inwardly, resulting in a failure of the catheter 62 to enter the vessel lumen 166.

Meanwhile, at the second time during the medical procedure, the tip 106 of the curved introducer 102 of the vascular access device 100 of FIGS. 3A-5 has penetrated the proximal wall 162 of the blood vessel 160, and since the second distortion 208 of the proximal wall 162 is relatively smaller, the distal end 118 of the catheter 112 has also penetrated the proximal wall 162. At this point, the medical practitioner may see a blood in the blood flashback aperture 116 of the curved introducer 102, and due to the curvature of the curved shaft 104, may more confidently advance the additional slight amount (e.g. 1-2 mm) into the vessel lumen 166 so that the distal end 118 of the catheter 112 will be positioned within the vessel lumen 166. The medical practitioner may then push the catheter 112 along the shaft 104 of the curved introducer 102 to advance the distal end 118 into the vessel lumen 166, resulting in a successful insertion of the catheter 112 into the vessel lumen 166.

It will be appreciated that, in some embodiments, the curved shaft 104 of the curved introducer 102 can be more confidently advanced the additional slight amount (e.g. 1-2 mm) into the vessel lumen 166 so that the distal end 118 of the catheter 112 will be more reliably positioned within the vessel lumen 166 when pushed off the shaft 104 of the curved introducer 102. During these actions, the tip 106 of the curved introducer 102 is less likely to impact the endothelium of the distal wall 164 because the more axially-directed insertion will not result in as much depression or distortion of the proximal wall 162 and the tip 106 of the curved introducer 102 is likely to not be as close to the distal wall 164 in comparison with the prior art vascular access device 50.

Figure 11A:
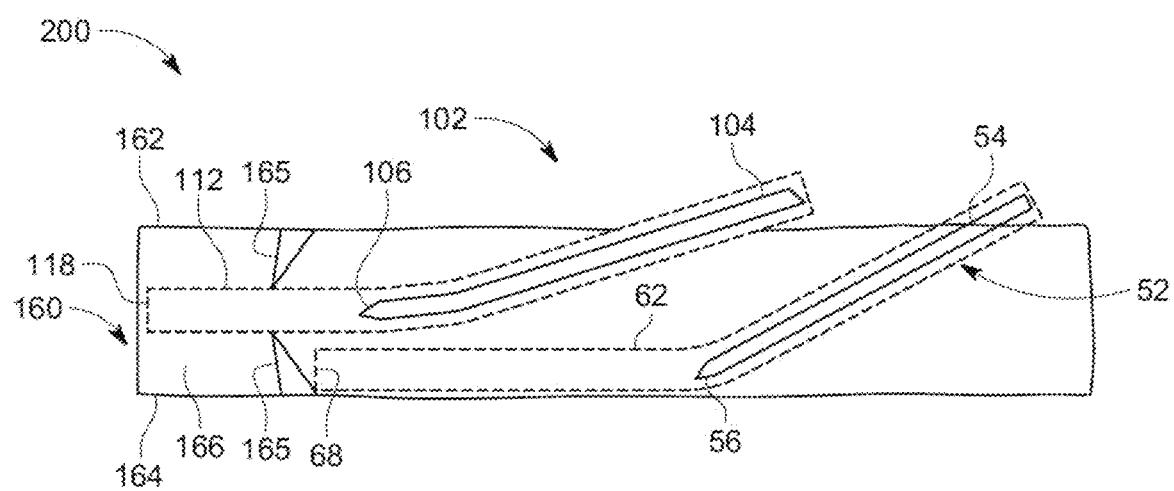

FIG. 11A shows the third operating environment 200 at a third time during the medical procedure, at which the tip 56 of the needle 52 of the prior art vascular access device 50 has penetrated the proximal wall 162, and as a result of seeing the blood in the blood flashback aperture 66 of the needle 52, the medical practitioner has advanced the tip 56 a sufficient distance to enable the distal end 68 of the catheter 62 to pass beyond the first distortion 204 of the proximal wall 162 of the blood vessel 160. The tip 56 of the needle 52 is proximate to (or in contact with) the distal wall 164 of blood vessel 160 (e.g. the rounded lower surface 72 of the tip 56 shown in FIG. 2). The medical practitioner has pushed the catheter 62 along the shaft 54 of the needle 52 to advance the distal end 68 of the catheter 62 beyond the tip 56 of the needle 52 and into the vessel lumen 166. As routinely occurs during medical procedures using the prior art vascular access device 50, the catheter 62 has contacted the distal wall 164 of the blood vessel 160 as it is advanced along the first direction 203 (FIG. 9) off of the end of the shaft 54 of the needle 52 and is turned by the distal wall 164 to advance longitudinally along the distal wall 164 of the blood vessel 160. As further shown in FIG. 11A, the blood vessel 160 includes one or more valves 165 extend inwardly from the proximal wall 162 and the distal wall 164 of the blood vessel 160, which help to ensure proper flow direction of the blood within the blood vessel 160. In some embodiments, as the medical practitioner advances the catheter 62 of the prior art vascular access device 50 into the blood vessel 160, the distal end 68 of the catheter 62 advances along the distal wall 164 of the blood vessel 160 until it is adjacent to the valve 165 that extends from the distal wall 164 into the blood vessel 160.

Also shown in FIG. 11A, the tip 106 of the curved introducer 102 of the vascular access device 100 of FIGS. 3A-5 has also penetrated the proximal wall 162, and the medical practitioner has advanced the tip 106 a sufficient distance to enable the distal end 118 of the catheter 112 to pass beyond the second distortion 208 of the proximal wall 162 of the blood vessel 160. The tip 106 of the curved introducer 102 is approximately centered within the vessel lumen 166, and is spaced apart from the distal wall 164 of blood vessel 160. In addition, the medical practitioner has pushed the catheter 112 along the shaft 104 of the curved introducer 102 to advance the distal end 118 of the catheter 112 beyond the tip 106 of the curved introducer 102 and into the vessel lumen 166. Notably, the catheter 112 has been successfully positioned within the vessel lumen 166 with no requirement that it contacted the distal wall 164 of the blood vessel 160, and in particular, there is no engagement of the catheter 112 with the distal wall 164 required to turn the catheter 112 as it is advanced generally axially or longitudinally along the vessel lumen 166 of the blood vessel 160. And in some embodiments, as the medical practitioner advances the catheter 112 of the vascular access device 100 into the blood vessel 160, the distal end 118 of the catheter 112 advances approximately along a central portion of the blood vessel 160 such that it does not become blocked or positioned adjacent to the valve 165 that extends from the distal wall 164 into the blood vessel 160.

Figure 11B:
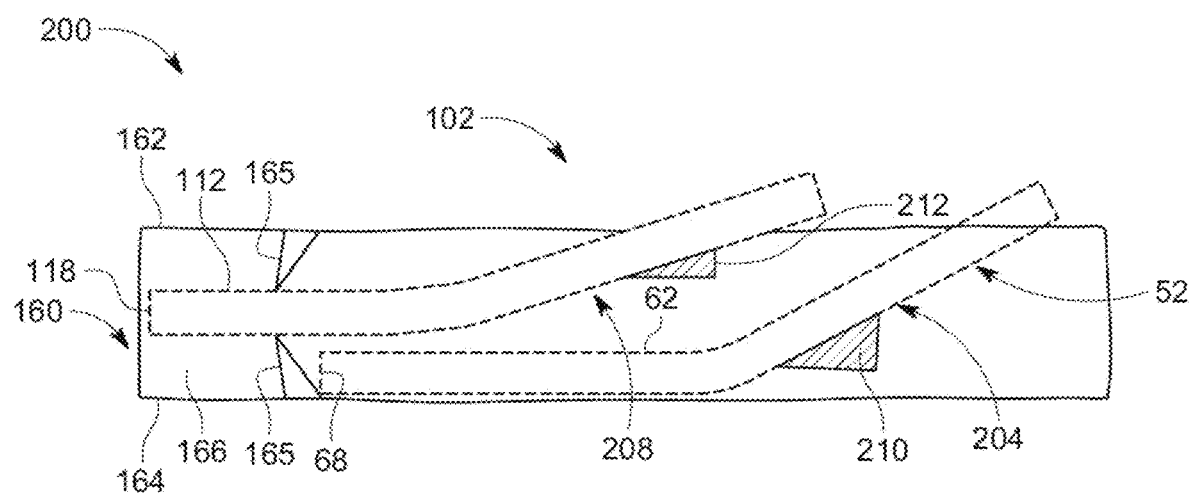

FIG. 11B shows the third operating environment 200 at a fourth time during the medical procedure, at which time the needle 52 of the prior art vascular access device 50 has been withdrawn from the catheter 62. A first thrombus 210 has formed on the upstream surface of the catheter 62 near the point of insertion of the catheter 62 through the proximal wall 162. Similarly, the curved introducer 102 of the vascular access device 100 has also been withdrawn from the catheter 112, and a second thrombus 212 has formed on the upstream surface of the catheter 112 near the point of insertion of the catheter 112 through the proximal wall 162. In some embodiments, the first thrombus 210 is larger than the second thrombus 212 due to the greater incidence angle (and greater distortion of the proximal wall) associated with the needle 52 of the prior art vascular access device 50 in comparison with the curved introducer 102 of the vascular access device 100 in accordance with the present disclosure.

It may be appreciated that a desirable goal of the vascular access device 100 is to insert the catheter 112 into the blood vessel 160 without impacting the endothelial portion of the distal wall 164, and that the curved introducer 102 of the vascular access device 100 in accordance with the present disclosure provides a higher probability of achieving that goal in comparison with prior art devices. The straight shaft 54 of the prior art vascular access device 50 undesirably results in the catheter 62 always (or very nearly always) impacting the endothelium of the distal wall 164 to some degree since the prior art approach depends on the distal wall 164 redirecting the catheter 62 and turning it axially into the vessel lumen 166 as it advances beyond the tip 56 of the needle 52, which places the catheter 62 along the distal wall 164. In addition, in some embodiments, the first thrombus 210 may be larger than the second thrombus 212 due to the greater incidence angle (and greater distortion of the proximal wall) associated with the needle 52 of the prior art vascular access device 50 in comparison with the curved introducer 102 of the vascular access device 100 in accordance with the present disclosure. In other words, the curved introducer 102 enables a smaller angle of insertion which reduces or minimizes the potential of embolism formation.

From the foregoing discussion, it will be appreciated that embodiments of vascular access devices having a curved introducer in accordance with the present disclosure may provide considerable operational advantages over prior art devices. For example, vascular access devices having a curved introducer may advantageously provide improved success rates for insertion of catheters into blood vessels or the like, and may reduce the risk of irritating or damaging the endothelial layers of the blood vessel. Embodiments in accordance with the present disclosure may also provide reduced thrombus formation within the blood vessel at the insertion site due to reduced distortion of the blood vessel proximal wall.

Accordingly, in some embodiments, a vascular access device 100 includes a curved introducer 102 having a shaft 104 that includes a tip 106 disposed at a distal end of the shaft 104, the tip 106 configured to penetrate at least a proximal wall 162 of a blood vessel 160 of a patient. In some embodiments, the shaft 104 has a straight section (e.g. proximal shaft section 130) and a curved section (e.g. intermediate shaft section 134) disposed between the straight section 130 and the tip 106. The curved section 134 may be configured to provide a curvature between the straight section 130 and the tip 106 such that a tip longitudinal axis (e.g. distal longitudinal axis 138) that extends from the tip 106 forms an introducer angle $\beta$ with a straight longitudinal axis (e.g. proximal longitudinal axis 132) of the straight section 130. In some embodiments, the introducer angle $\beta$ is configured to at least partially reduce contact by the tip 106 with a distal wall 164 of the blood vessel 160 after the tip 106 has been inserted through the proximal wall 162 of the blood vessel 160.

In addition, in some embodiments, the introducer angle $\beta$ provided by the curved section 134 is configured to approximately align the tip longitudinal axis 138 with a vessel longitudinal axis of the blood vessel after the tip 106 has been inserted through the proximal wall 162 of the blood vessel 160. And in some embodiments, the introducer angle $\beta$ provided by the curved section 134 is configured to approximately align the tip longitudinal axis 138 with a vessel longitudinal axis of the blood vessel 160 so that as a distal end 118 of a catheter 112 is advanced past the tip 106 of the curved introducer 102, a catheter axis of the catheter 112 is approximately parallel with the vessel longitudinal axis.

In some embodiments, the introducer angle $\beta$ is within a range of approximately five degrees to approximately forty-five degrees, inclusive. In some embodiments, the introducer angle $\beta$ is within a range of approximately fifteen degrees to approximately thirty degrees, inclusive. And in some embodiments, the curved section 134 is disposed within a distal thirty percent of a length of the shaft 104 of the curved introducer 102.

In some embodiments, the shaft 104 further includes a distal section (e.g. distal shaft section 136) that includes the tip 106, the distal section 136 having a distal longitudinal axis 138 that is straight. In further embodiments, the shaft 104 defines a passage 125 extending from a proximal end of the shaft 104 to the tip 106, the passage 125 being configured to permit a fluid flow through the curved introducer 102. And in some embodiments, the shaft 104 further includes a blood viewing aperture 116 disposed therein in fluidic communication with the passage 125 for permitting visual observation of a fluid in the introducer 102 following insertion of the tip 106 through the proximal wall 162 of the blood vessel 160.

Embodiments of vascular access devices having a curved introducer in accordance with the present disclosure are not limited to the particular embodiments described above. It should be appreciated that based on the present disclosure, numerous variations and additional embodiments in accordance with the present disclosure may be conceived. Accordingly, in the following discussion, additional embodiments of vascular access devices having a curved introducer are described, but the present disclosure should not be construed as being limited to the particular embodiments described herein.

Figure 12:
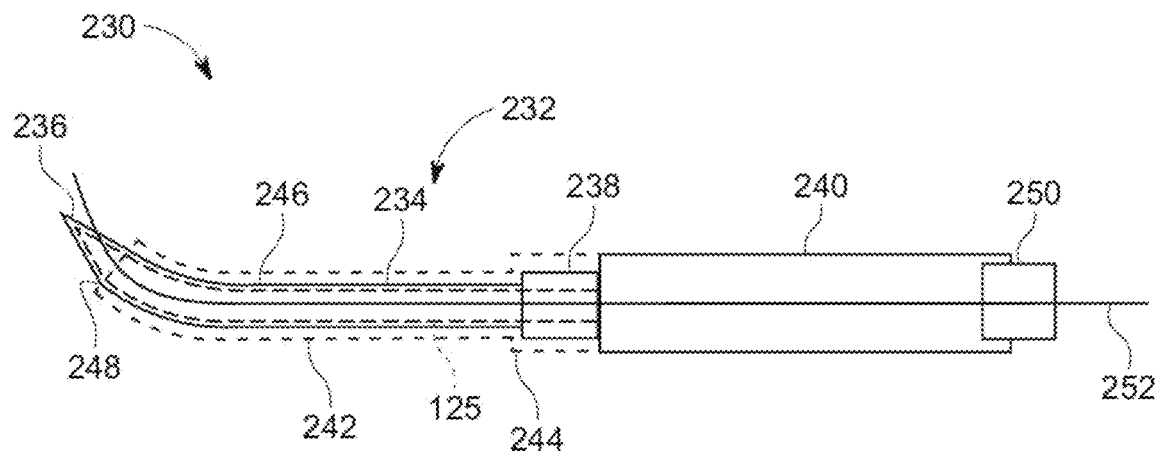
FIG. 12 shows a side elevational view of a vascular access device having a curved introducer for performing a catheter insertion in accordance with another embodiment of the present disclosure.

For example, FIG. 12 shows a side elevational view of a vascular access device 230 having a curved introducer 232 for performing a catheter insertion in accordance with another embodiment of the present disclosure. It will be appreciated that the vascular access device 230 shown in FIG. 12 has several components that are substantially similar or identical to the components of the vascular access device 100 described above, and therefore, for the sake of brevity, the following discussion may focus primarily on the additional aspects or components not previously described.

More specifically, in some embodiments, the curved introducer 232 of the vascular access device 230 includes a shaft 234 having a tip 236 that is used to puncture the skin of the patient and to penetrate other tissues of the patient (e.g. a proximal wall 162 of a blood vessel 160). As described above and shown in FIGS. 4-5, the shaft 234 of the curved introducer 232 defines a hollow passage 125 through which fluids are able to flow. As further shown in FIG. 12, in some embodiments, the curved introducer 232 is coupled to an introducer hub 238 which is, in turn, coupled to a housing 240 which serves as a handle for a medical practitioner to hold while manipulating the vascular access device 230. A blood viewing aperture 246 may be formed in the shaft 234 at a relatively small distance away from the tip 236 of the curved introducer 232, which is visible to the medical practitioner (e.g. through a catheter 242) to enable the medical practitioner to view a fluid within the hollow passage 125 of the curved introducer 232.

A catheter 242 may be positioned over a portion of the shaft 234 of the curved introducer 232, and coupled to a catheter hub 244 which is removably coupled to the introducer hub 238. The catheter 242 may include a distal end 248 proximate the tip 236 of the curved introducer 232. The catheter 242 may be formed of a transparent, flexible polymeric material as is known in the relevant art. In some embodiments, however, the catheter 242 and catheter hub 244 may be eliminated.

As further shown in FIG. 12, in some embodiments, the vascular access device 230 further includes a connection portal 250 operatively coupled to the housing 240. In some embodiments, the connection portal 250 may provide a sealable entrance or entry point for an accessory device that a medical practitioner may wish to insert into the patient's body via the vascular access device 230 (e.g. through housing 240 and through hollow passage 125 of curved introducer 232), such as a wire, optical fiber, probe, or any other suitable accessory device. In some embodiments, the connection portal 250 provides a blood barrier insertion connection portal for the insertion of accessory devices at the proximal end of the vascular access device 230 that may be advantageous for a variety of medical procedures other than (or in addition to) the insertion of catheters.

For example, in some embodiments, the connection portal 250 may provide access for a tool 252 to be inserted into the connection portal 250 and extended through the vascular access device 230. In some embodiments, the tool 252 may be a metal or plastic stylet that may act as a mandrel which the medical practitioner may use to adjust a curvature of the curved introducer 232, or which may be used to steer or curve the catheter 242 as the catheter 242 is extended beyond the tip 26 of the curved introducer 362.

Figure 13:
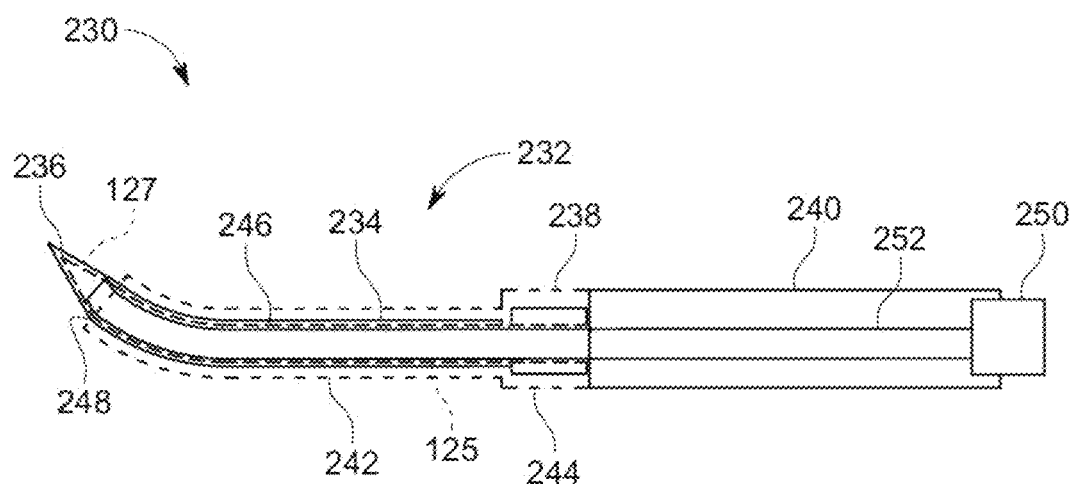
FIG. 13 shows a side partial cross-sectional view of the vascular access device of FIG. 12 in a first use configuration in accordance with an embodiment of the present disclosure.

For example, FIG. 13 shows a side partial cross-sectional view of the vascular access device 230 of FIG. 12 in a first use configuration in accordance with an embodiment of the present disclosure. In this embodiment, an optical fiber 252 is disposed within the vascular access device 230. In some embodiments, the optical fiber 252 extends between the connection portal 250 at the proximal end of the vascular access device 230 to the exit aperture 127 (FIG. 5) formed within the tip 236 of the curved introducer 232. In some embodiments, the connection portal 250 may provide access (or egress) for the optical fiber 252 so that the optical fiber 252 may transmit light into the vasculature (e.g. blood vessel 160) and acquire data from the tip 236 of the curved introducer 232 to provide to a receiving and processing component that may be attached directly to the connection portal 250. In some embodiments, the optical fiber 252 may conduct different light forms that facilitate guidance to the blood vessel 160 and intra-lumen positioning of the catheter 242. Examples of possible light forms that may be conducted by the optical fiber 252 include white light, RGB emitting light, UV or IR light, glow fibers, or any other suitable forms.

In some embodiments, after the catheter 242 has been advanced such that the distal end 248 of the catheter 242 is pushed beyond the tip 236 of the curved introducer 232 (e.g. as shown in FIG. 11), the optical fiber 252 may also be advanced through the exit aperture 127 formed within the tip 236 so that the optical fiber 252 extends into the catheter 242. In some embodiments, the optical fiber 252 may be advanced to the distal end 248 of the catheter 242 (or possibly beyond the distal end 248) so that the optical fiber 252 may transmit light into the vasculature (e.g. blood vessel 160) and acquire data proximate (or beyond) the distal end 248 of the catheter 242.

Figure 14:
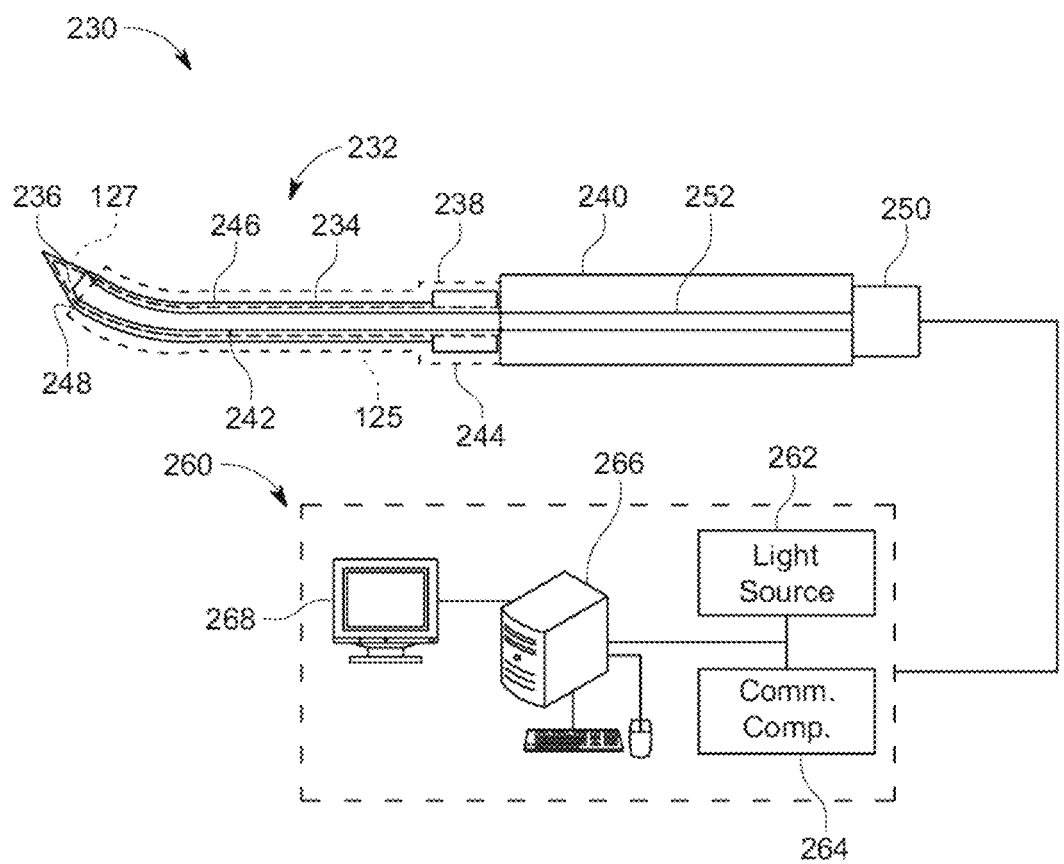
FIG. 14 shows a side partial cross-sectional view of the vascular access device of FIG. 12 in a second use configuration in accordance with an embodiment of the present disclosure.

FIG. 14 shows a side partial cross-sectional view of the vascular access device 230 of FIG. 12 in a second use configuration in accordance with an embodiment of the present disclosure. In this embodiment, the optical fiber 252 disposed within the vascular access device 230 is operatively coupled to an optical analysis system 260. In some embodiments, the optical analysis system 260 may include a light source 262 for providing light to the optical fiber 252, a communication component 264 (e.g. transceiver) that transmits light to or receives light from (or both) the optical fiber 252, a processing and control module 266 that controls the other components of the optical analysis system 260 and processes and analyzes the signals (e.g. reflected light) received back from the optical fiber 252, and a display 268 that provides a visual display of the analysis results from the processing and control module 266. The optical analysis system 260 is generally known and a variety of suitable systems are commercially available for use in medical applications.

Figure 15:
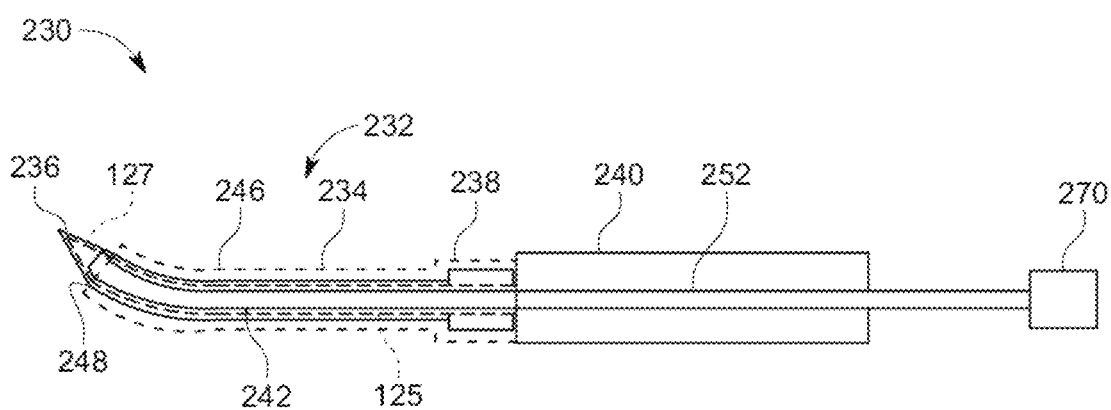
FIG. 15 shows a side partial cross-sectional view of the vascular access device of FIG. 12 in a third use configuration in accordance with an embodiment of the present disclosure.

FIG. 15 shows a side partial cross-sectional view of the vascular access device 230 of FIG. 12 in a third use configuration in accordance with an embodiment of the present disclosure. In this embodiment, the connection portal 250 has been removed, and the optical fiber 252 extends through the housing 240 of the vascular access device 230 to a connector 270 in a configuration that may be referred to as a pigtail connector. In some embodiments, the connector 270 may be coupled to other suitable connectors or components for performing a medical procedure, such as the optical analysis system 260 (FIG. 14), a camera or other visualization system, or any other suitable components. In some embodiments, the connector 270 may be a commercially-available component that is generally known for use in medical applications. It will be appreciated that, in some embodiments, the pigtail connector (e.g. connector 270) may advantageously facilitate maintaining sterility around the site of insertion of the curved introducer 232 into the patient.

Figure 16:
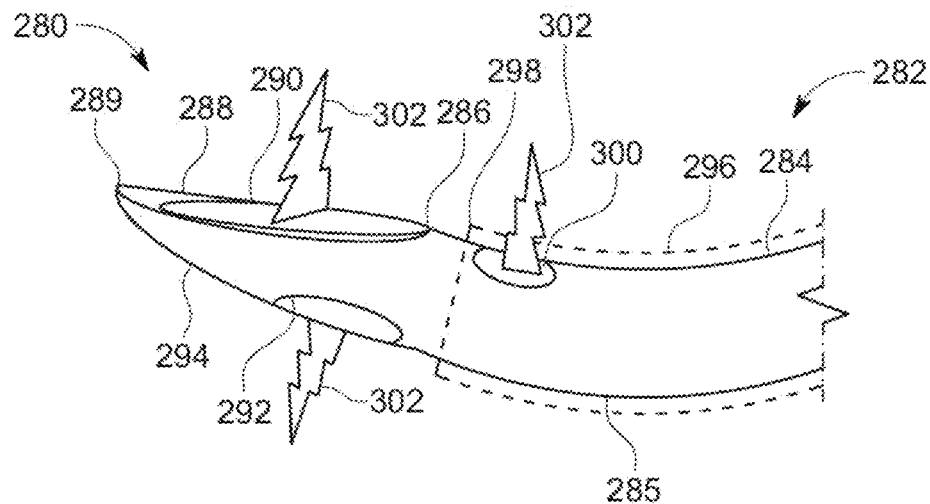
FIG. 16 shows an enlarged, side elevational view of a distal portion of a curved introducer of a vascular access device in accordance with an embodiment of the present disclosure.
Figure 17:
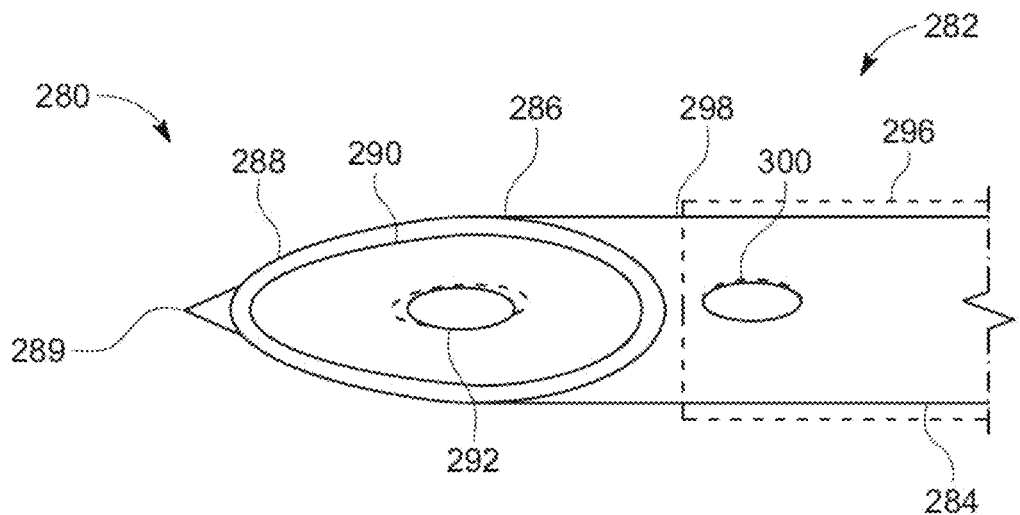
FIG. 17 shows a top elevational view of the distal portion of the curved introducer of the vascular access device of FIG. 16 in accordance with an embodiment of the present disclosure.

FIG. 16 shows an enlarged, side elevational view of a distal portion 280 of a curved introducer 282 of a vascular access device in accordance with an embodiment of the present disclosure. FIG. 17 shows a top elevational view of the distal portion 280 of the curved introducer 282 of FIG. 16. In this embodiment, the curved introducer 282 includes a shaft 284 having a curved portion 285, and a tip 286 having a beveled surface 288 that faces generally upwardly. The beveled surface 288 forms a distal point 289 (or sharp point) for penetrating the skin surface and other tissues of the patient during a medical procedure. In some embodiments, the tip 286 further includes an anterior tip aperture 290 formed within the beveled surface 288, and a posterior tip aperture 292 formed within a lower surface 294 of the tip 286 opposite from the beveled surface 288. As best shown in FIG. 17, in some embodiments, the posterior tip aperture 292 may be smaller than the anterior tip aperture 290, the anterior tip aperture 290 generally being an exit aperture of a hollow passage (e.g. hollow passage 125 of FIGS. 4-5), however, in other embodiments, the posterior tip aperture 292 may be larger than, or of equal size to, the anterior tip aperture 290. As further shown in FIGS. 16-17, a tubular member 296 (e.g. catheter) may be disposed over the shaft 284 of the curved introducer 282 such that a distal end 298 of the tubular member 296 is positioned proximate to the tip 286 of the shaft 284. In addition, an indicator aperture 300 may be formed in the curved portion 285 of the shaft 284 and may be covered by tubular member 296 and positioned proximate the distal end 298 of the tubular member 296. In some embodiments, light 302 may be emitted from one or more of the anterior tip aperture 290, the posterior tip aperture 292, and the indicator aperture 300, as described more fully below.

In operation, embodiments of vascular access devices having a curved introducer may be used to project light 302 into a vasculature of a patient for a variety of purposes. For example, in some embodiments, light 302 may be emitted from one or more apertures of the tip 286 (e.g. one or more of the anterior tip aperture 290, the posterior tip aperture 292, and the indicator aperture 300) of the curved introducer 282 to perform a desired procedure. For example, in some embodiments, an optical fiber (e.g. optical fiber 252 as shown in FIGS. 13-15) may be disposed within the curved introducer 282 and may conduct relatively bright visible red light outwardly from one or more of the apertures of the curved introducer 282 to transilluminate the location and direction of the needle during probing and insertion relative to the blood vessel from a subcutaneous perspective. In some embodiments, the light 302 would be visible from outside the skin surface, and may assist the medical practitioner to identify the blood vessel under the skin surface as the tip 286 of the curved introducer 282 approaches the blood vessel. During insertion into the blood vessel, the intensity of the light 302 visible from outside the skin surface would diminish as the tip 286 and one or more of the light-emitting apertures (e.g. anterior tip aperture 290, the posterior tip aperture 292, or both) penetrates the proximal wall of the blood vessel, and as the tip 286 continues to advance into the blood vessel, the radiating light 302 emitted by the indicator aperture 300 would also diminish or disappear from view as viewed from outside the skin surface to indicate to the medical practitioner that the distal end 298 of the tubular member 296 (e.g. catheter) is in the vessel lumen.

In some embodiments, alternatively or in concert with the transillumination, an optical fiber (e.g. optical fiber 252 as shown in FIGS. 13-15) could transmit light through a connector (e.g. connector 270 shown in FIG. 15) to a sensor that would transform the light to sound. In some embodiments, the light from the connector could be provided to an optical analysis system (e.g. optical analysis system 260 of FIG. 14) which may display the variation of intensities that are proportional to the distance of the tip 286 from the vessel wall. For example, in some embodiments, the medical practitioner could know the direction of each light-emitting aperture by landmarks on the vascular access device (e.g the introducer hub 108, 238, the retraction cover 110, the housing 240, etc). In some embodiments, a separate optical fiber could be used to provide light to each light-emitting aperture (e.g. three optical fibers), and an optical analysis system (e.g. optical analysis system 260 of FIG. 14) could comparatively monitor each position of each light-emitting aperture.

Although the embodiments described above have depicted the tip of the curved introducer as having a generally upwardly-facing beveled surface, it will be appreciated that in other embodiments, the tip of the curved introducer may have a beveled surface that is facing other than generally upward, including downwardly-facing beveled surfaces, or any other directionally-facing beveled surfaces. While it is believed that most medical practitioners will prefer to operate the curved introducer with the beveled surface facing generally upwardly, it is also believed that some medical practitioners may prefer to operate a curved introducer with a beveled surface that faces generally downwardly.

Figure 18:
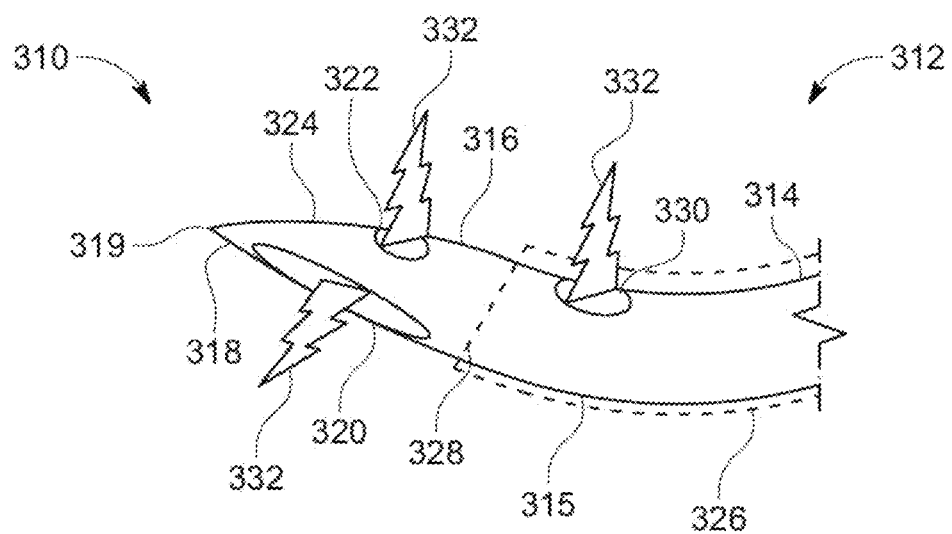
FIG. 18 shows an enlarged, side elevational view of a distal portion of a curved introducer of a vascular access device in accordance with another embodiment of the present disclosure.
Figure 19:
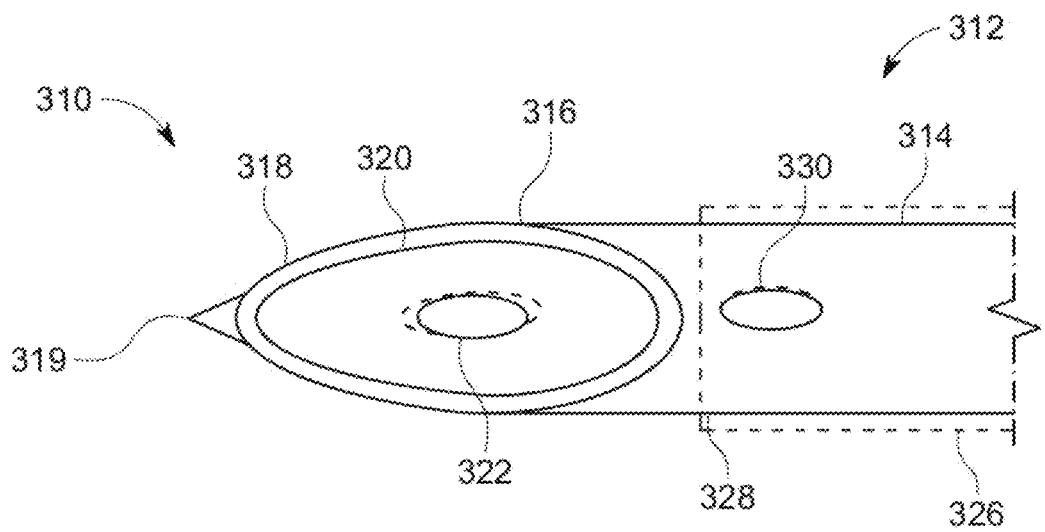
FIG. 19 shows a bottom elevational view of the distal portion of the curved introducer of the vascular access device of FIG. 18 in accordance with another embodiment of the present disclosure.

For example, FIG. 18 shows an enlarged, side elevational view of a distal portion 310 of a curved introducer 312 of a vascular access device in accordance with an embodiment of the present disclosure. FIG. 19 shows a bottom elevational view of the distal portion 310 of the curved introducer 312 of FIG. 18. In this embodiment, the curved introducer 312 includes a shaft 314 having a curved portion 315, and a tip 316 having a beveled surface 318 that faces generally downwardly. The beveled surface 318 forms a distal point 319 (or sharp point) for penetrating the skin surface and other tissues of the patient during a medical procedure. In some embodiments, the tip 316 further includes an anterior tip aperture 320 formed within the downwardly-facing beveled surface 318, and a posterior tip aperture 322 formed within an upper surface 324 of the tip 316 opposite from the beveled surface 318. Again, as best shown in FIG. 19, in some embodiments, the posterior tip aperture 322 may be smaller than the anterior tip aperture 320, the anterior tip aperture 320 generally being an exit aperture of a hollow passage (e.g. hollow passage 125 of FIGS. 4-5), however, in other embodiments, the posterior tip aperture 322 may be larger than, or of equal size to, the anterior tip aperture 320. As further shown in FIGS. 18-19, a tubular member 326 (e.g. catheter) may be disposed over the shaft 314 of the curved introducer 312 such that a distal end 328 of the tubular member 326 is positioned proximate to the tip 316 of the shaft 314. In addition, an indicator aperture 330 may be formed in the curved portion 315 of the shaft 314 and may be covered by tubular member 326 and positioned proximate the distal end 328 of the tubular member 326. In some embodiments, light 332 may be emitted from one or more of the anterior tip aperture 320, the posterior tip aperture 322, and the indicator aperture 330, as described more fully below.

Accordingly, in some embodiments, the curved introducer 312 having a generally downwardly-facing beveled surface 318 (shown in FIGS. 18-19) may be used in any of the medical procedures described herein, including those for the curved introducer 282 having a generally upwardly-facing beveled surface 288 (shown in FIGS. 16-18), and also including any of the medical procedures described above with respect to FIGS. 1-15. It will be appreciated that embodiments of curved introducers in accordance with the present disclosure may advantageously place the tip 316 having the generally downwardly-facing bevel surface 318 in a better approach to efficiently and effectively engage the skin surface as well as the blood vessel proximal wall, thereby reducing risk of damage or irritation to the distal wall of the blood vessel in comparison with prior art devices. The above-noted advantages of embodiments of vascular access devices having a curved introducer may therefore be achieved regardless of whether the tip of the curved introducer has a "bevel up" or "bevel down" configuration.

Figure 20:
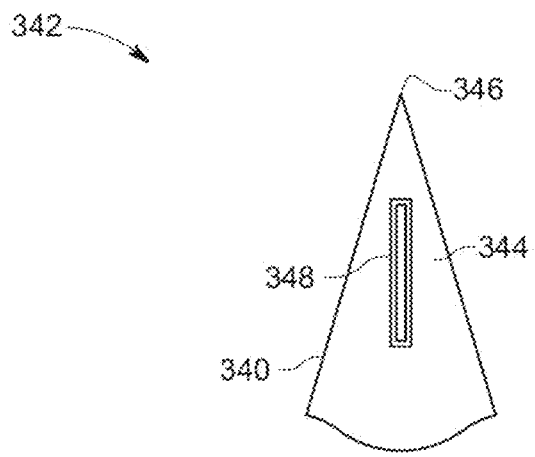
FIG. 20 shows an enlarged, side elevational view of a tip of a curved introducer of a vascular access device in accordance with another embodiment of the present disclosure.
Figure 21:
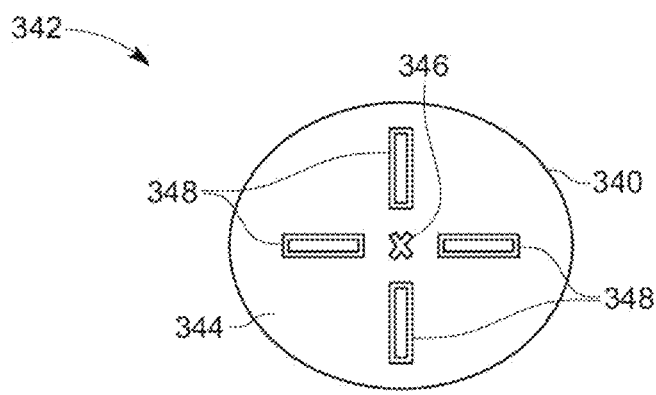
FIG. 21 shows a top elevational view of the tip of the curved introducer of the vascular access device of FIG. 20 in accordance with another embodiment of the present disclosure.

Similarly, FIG. 20 shows an enlarged, side elevational view of a tip 340 of a curved introducer 342 of a vascular access device in accordance with another embodiment of the present disclosure. FIG. 21 shows a top elevational view of the tip 340 of the curved introducer 342 of FIG. 20. In this embodiment, the tip 340 includes a conical surface 344 forming a distal point 346 for penetrating the skin surface and other tissues of a patient. A plurality of apertures 348 are disposed through the conical surface 344. In the embodiment shown in FIGS. 20-21, there are four apertures 348 disposed through the conical surface 344, and the apertures 348 are evenly distributed about the circumference of the conical surface 344. In other embodiments, a greater or fewer number of apertures 348 may be used. In some embodiments, each of the apertures 348 may be a light-emitting aperture, and the tip 340 of the curved introducer 342 may be used for performing medical procedures, including the subcutaneous transillumination procedures described above with respect to FIGS. 16-19. It will be appreciated that the apertures 348 may emit light from one or more optical fibers (e.g. four optical fibers) for determining location of the tip 340 during medical procedure, such as during insertion into a vessel lumen or the like.

Figure 22:
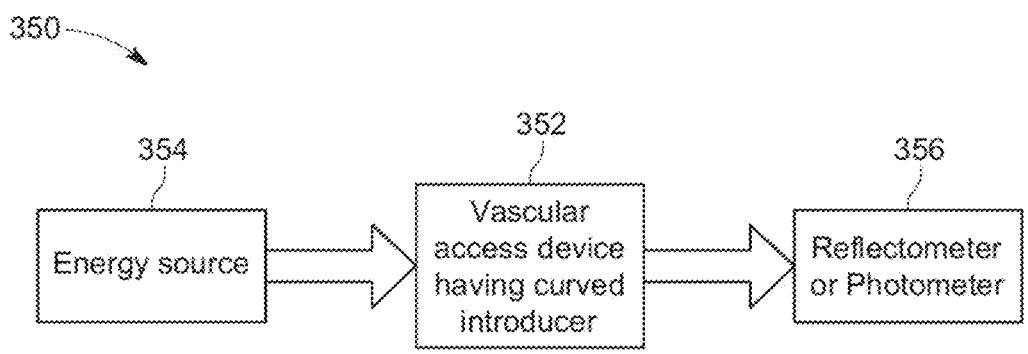
FIG. 22 shows a schematic view of a system that includes a vascular access device having a curved introducer in accordance with an embodiment of the present disclosure.

Embodiments of vascular access devices having a curved introducer in accordance with the present disclosure may be used in association with a wide variety of systems for performing a wide variety of medical procedures. For example, some embodiments of vascular access devices were described above as being used in association with an optical analysis system (e.g. the optical analysis system 260 depicted in FIG. 14). It will be appreciated that vascular access devices having a curved introducer as disclosed herein may be used in association with other suitable systems. For example, FIG. 22 shows a schematic view of a system 350 that includes a vascular access device 352 having a curved introducer in accordance with an embodiment of the present disclosure. More specifically, in this embodiment, the system 350 includes an energy source 354 operatively coupled to the vascular access device 352, and a reflectometer or photometer 356 operatively coupled to the vascular access device 352. In operation, with the vascular access device 352 having a curved introducer successfully positioned within a patient, the energy source 354 may provide energy into the vascular access device 352 to illuminate a tissue of the patient. The vascular access device 352 may then provide energy reflected by the tissue of the patient to the reflectometer or photometer 356 for analysis. The system 350 may be used in conjunction with (or independently of) the optical analysis system 260 depicted in FIG. 14. In some embodiments, the energy source 354 may provide energy suitable for performing UWB radar procedures (e.g. 3.1 GHz-10.4 GHz). In other embodiments, the energy source 354 may provide energy suitable for performing near infrared transillumination (e.g. 770 nm-900 nm), and may, for example, provide energy from one or more of red, orange, green, or white LED sources. Of course, other suitable systems may be conceived that employ embodiments of vascular access devices having a curved introducer in accordance with the present disclosure.

Figure 23:
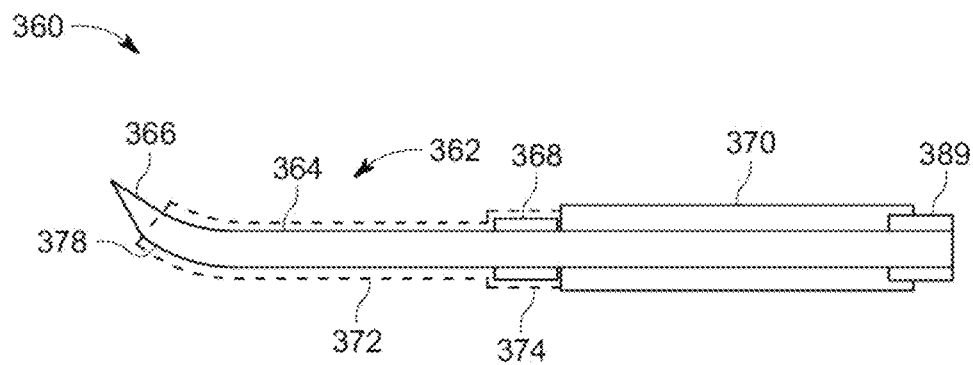
FIG. 23 shows a side elevational view of a vascular access device having a curved introducer having a solid shaft in accordance with an embodiment of the present disclosure.
Figure 24:
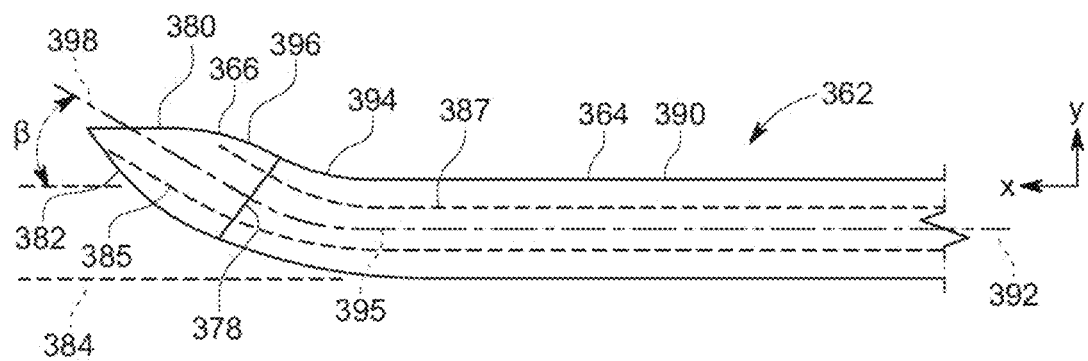
FIG. 24 shows an enlarged, side elevational view of a portion of the curved introducer of the vascular access device of FIG. 23 in accordance with an embodiment of the present disclosure.
Figure 25:
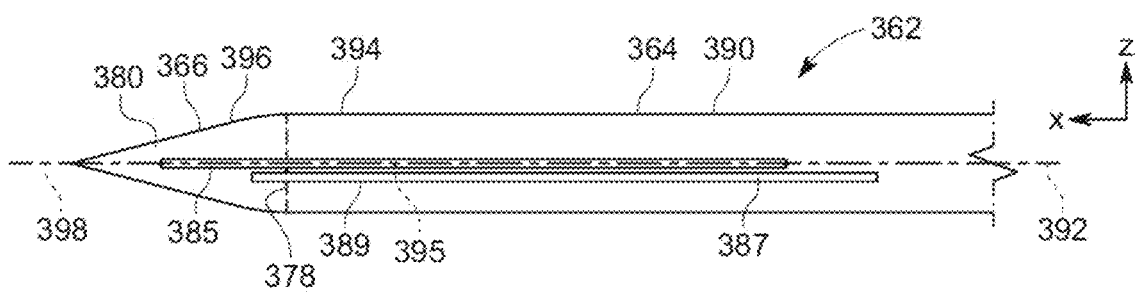
FIG. 25 shows a top elevational view of the portion of the curved introducer of the vascular access device of FIG. 24 in accordance with an embodiment of the present disclosure.

In some embodiments, the hollow passage within a curved introducer may be eliminated, and a curved introducer in accordance with the present disclosure may have a solid shaft. For example, FIG. 23 shows a side elevational view of a vascular access device 360 having a curved introducer 362 for performing a catheter insertion in accordance with an embodiment of the present disclosure. FIGS. 24 and 25 are enlarged side and top elevational views of a portion of the curved introducer 362 of FIG. 23. In some embodiments, the curved introducer 362 includes an elongated shaft 364 having a tip 366 that is used to puncture the skin of the patient and to penetrate other tissues of the patient, including a proximal wall of a vasculature.

As best shown in FIGS. 4-5, in some embodiments, the shaft 364 of the curved introducer 362 include a proximal shaft section 390 that is disposed about a proximal longitudinal axis 392, an intermediate shaft section 394 that is disposed about an intermediate longitudinal axis 395, and a distal shaft section 396 that is disposed about a distal longitudinal axis 398. In some embodiments, the proximal shaft section 390 is a straight cylindrical section, and the proximal longitudinal axis 392 is a straight axis. In some embodiments, the intermediate shaft section 394 is a curved cylindrical section, and the intermediate longitudinal axis 395 is a curved axis (e.g. in an x-y plane). And in some embodiments, the distal shaft section 396 is a straight cylindrical section, and the distal longitudinal axis 398 is also a straight axis. It will be appreciated that the distal longitudinal axis 398 of the curved introducer 362 is not co-linear with the proximal longitudinal axis 392, and that due to the curvature of the curved shaft section 394 (visible in FIG. 24), the distal longitudinal axis 398 is disposed at an introducer angle β with respect to the proximal longitudinal axis 392 (e.g. in the x-y plane). For example, in some embodiments, the introducer angle β may have a value within a range of approximately 5 degrees to approximately 50 degrees. More specifically, in some embodiments, the introducer angle β may have a value of approximately 30 degrees.

As further shown in FIG. 24, the distal shaft section 396 includes the tip 366 of the curved introducer 362. In some embodiments, the tip 366 may have a beveled surface 380 (see FIGS. 24-25) that is generally (or approximately) upwardly facing, and angled obliquely to the distal longitudinal axis 398, creating a sharp, cutting edge for the tip 366 to penetrate the skin and other tissues of the patient. And in some embodiments, the tip 366 includes a rounded lower surface 382 positioned across from the bevel 380 on the opposite (or downwardly facing) side of the tip 366. In some embodiments, the curvature of the intermediate shaft section 394 results in the tip 366 of the shaft 364 to extend beyond a cylindrical outer boundary 384 (represented by dashed lines) that represents an imaginary extension of the straight, proximal shaft section 390 of the shaft 364 of the curved introducer 362.

It will be appreciated that the relative lengths of the proximal shaft section 390, intermediate shaft section 394, and distal shaft section 396 may vary from that shown in FIGS. 24-25. For example, in some embodiments, the curved intermediate shaft section 394 may be longer or shorter than the embodiment shown in FIGS. 24-25. In some embodiments, the curved intermediate shaft section 394 may be disposed at any desired location along the entire length of the curved introducer 362. Alternately, in some embodiments, the curved intermediate shaft section 394 may be positioned (or occur) anywhere within the distal half of the length of the curved introducer 362 (i.e. distal half that includes the tip 366). In some embodiments, the curved intermediate shaft section 394 may be positioned (or occur) anywhere within the distal 30% of the length of the curved introducer 362 (i.e. distal 30% that includes the tip 366). And in some embodiments, the distal shaft section 396 may be eliminated, and the tip 366 may be part of the curved intermediate shaft section 394.

As further shown in FIGS. 23-25, in some embodiments, the curved introducer 362 is coupled to an introducer hub 368 which is, in turn, coupled to a housing 370 which serves as a handle for a medical practitioner to hold while manipulating the vascular access device 360. A catheter 372 may be positioned over a portion of the shaft 364 of the curved introducer 362, and coupled to a catheter hub 374 which may be removably coupled to the introducer hub 368. In some embodiments, the catheter 372 may be a flexible, transparent sleeve that is slidably engaged over the shaft 364 of the curved introducer 362. The catheter 372 may include a distal end 378 that, in some embodiments, may be tapered to provide less resistance during insertion into a vasculature. The catheter 372 may be positioned onto the shaft 364 with the distal end 378 positioned proximate to the tip 366 of the of the curved introducer 362.

In some embodiments, a first groove 385 (or first channel) may be disposed within an outer surface of the shaft 364 of the curved introducer 362. In some embodiments, the first groove 385 extends from the beveled surface 380 at the tip 366 of the shaft 364, along the distal shaft section 396, along the intermediate shaft section 394, and along at least a portion of the proximal shaft section 390. It will be appreciated that in other embodiments, the length of the first groove 385 may be longer or shorter than the particular embodiment shown in FIGS. 24-25. Because the first groove 385 begins at the beveled surface 380, when the tip 366 begins to penetrate a proximal wall of a blood vessel, blood from the blood vessel will flow along the first groove 385 and will be visible to the medical practitioner as a "blood flash" to indicate that the blood vessel has been successfully penetrated by the tip 366 of the curved introducer 362.

Similarly, in some embodiments, a second groove 387 (or second channel) may be disposed within an outer surface of the shaft 364 of the curved introducer 362. In some embodiments, the second groove 387 begins at a starting point 389 (see FIG. 25) that is slightly distal from and proximate to the distal end 378 of the catheter 372, and extends along the distal shaft section 396, along the intermediate shaft section 394, and along at least a portion of the proximal shaft section 390. It will be appreciated that in other embodiments, the length of the second groove 387 may be longer or shorter than the particular embodiment shown in FIGS. 24-25. Because the second groove 387 begins slightly distal to, and proximate to, the distal end 378 of the catheter 372, when the tip 366 is advanced into the blood vessel, blood from the blood vessel will flow along the second groove 387 and will be visible to the medical practitioner as a second "blood flash" to indicate that the distal end 378 of the catheter 372 is about to enter the blood vessel, indicating to the medical practitioner that the tip 366 only needs to be advanced slightly further in order to properly position the distal end 378 of the catheter 372 into the blood vessel for insertion of the catheter 372.

In operation, a medical practitioner may grasp the housing 370 and may manipulate the vascular access device 360 to insert the tip 366 of the curved introducer 362 through a patient's skin and into a vasculature (e.g. vein). As the tip 366 penetrates the proximal wall of the blood vessel, because the first groove 385 of the curved introducer 362 extends to proximate the beveled surface 380, blood from within the blood vessel will flow along the first groove 385 and will be visible to the medical practitioner as a visual indication that the tip 366 has successfully penetrated the proximal wall of the blood vessel. The medical practitioner may then continue to advance the curved introducer 362 of the vascular access device 360 further into the blood vessel until blood from the blood vessel begins to enter the second groove 387, indicating to the medical practitioner that the distal end 378 of the catheter 372 is entering (or about to enter) the blood vessel. The medical practitioner may then continue to advance the tip 366 of the curved introducer 362 slightly further to ensure that the distal end 378 of the catheter 372 is inserted through the proximal wall of the vasculature. If blood does not appear within the first groove 385 (or the second groove 387), the medical practitioner may withdraw the tip 366 of the curved introducer 362, reposition the vascular access device 360, and advance the tip 366 again until successful penetration of the blood vessel is achieved.

With the distal end 378 of the catheter 372 inserted within the vasculature, the medical practitioner may separate the introducer hub 368 from the catheter hub 374, and may advance the catheter 372 along the shaft 364 so that the distal end 378 of the catheter 372 is pushed beyond the tip 366 of the curved introducer 362 and into a desired position within the vasculature. The medical practitioner may then separate the introducer hub 368 from the catheter hub 374, withdrawing the curved introducer 362 from the vasculature and from the catheter 372. Accordingly, with the distal end 378 of the catheter 372 remains inserted into the blood vessel with the catheter hub 374 located external to the patient's skin so that the medical practitioner may attach other devices to the catheter hub 374 in order to perform a desired medical procedure, such as administration of a fluid or medicine into the vasculature, or the withdrawal of a sample from the vasculature for analysis.

Accordingly, in some embodiments, a vascular access device 360 includes a curved introducer 362 having a shaft 364 that includes a tip 366 disposed at a distal end of the shaft 364, the tip 366 configured to penetrate at least a proximal wall 162 of a blood vessel 160 of a patient. In some embodiments, the shaft 364 has a straight section (e.g. proximal shaft section 390) and a curved section (e.g. intermediate shaft section 394) disposed between the straight section 390 and the tip 366. The curved section 394 may be configured to provide a curvature between the straight section 390 and the tip 366 such that a tip longitudinal axis (e.g. distal longitudinal axis 398) that extends from the tip 366 forms an introducer angle β with a straight longitudinal axis (e.g. proximal longitudinal axis 392) of the straight section 390. In some embodiments, the introducer angle β is configured to at least partially reduce contact by the tip 366 (and the catheter 372) with a distal wall 164 of the blood vessel 160 after the tip 366 has been inserted through the proximal wall 162 of the blood vessel 160.

In some embodiments, the shaft 364 comprises a solid shaft 364 from a proximal end of the shaft 364 to the tip 366. And in some embodiments, the shaft 364 further includes a first groove 385 disposed within an outer surface of the shaft 364 and extending from the tip 366 toward the proximal end of the shaft 364 for permitting visual observation of a fluid in the first groove 385 following insertion of the tip 366 through the proximal wall 162 of the blood vessel 160. In addition, in some embodiments, the shaft 364 further includes a second groove 387 disposed within the outer surface of the shaft 364, the second groove 387 beginning at a starting point 389 that is distally-spaced from the tip 366, and extending toward the proximal end of the shaft 364 for permitting visual observation of a fluid in the second groove 387 following insertion of the starting point 389 through the proximal wall 162 of the blood vessel 160.

With continued reference to FIG. 23, in some embodiments, the solid shaft 364 of the curved introducer 362 may extend beyond the introducer hub 368 and at least partly into the housing 370. Moreover, in some embodiments, the shaft 364 of the curved introducer 362 may extend entirely through the housing 370. In some embodiments, a connector 389 may be operatively coupled to the solid shaft 364 of the curved introducer 362 (e.g. either directly or by a suitable coupling link). In some embodiments, the solid shaft 364 of the curved introducer 362 may be formed of an electrically conductive material (e.g. steel or other suitable metal) so that the shaft 364 can conduct electrical signals from the tip 366 to the connector 389 to be processed in a way to guide the curved introducer 362 during insertion into the blood vessel. For example, in some embodiments, electrical signals may be conducted through the shaft 364 of the curved introducer 362 to signal an entry of the tip 366 into the blood vessel, and/or to reveal the position of the tip 366 within the vessel lumen. Examples of suitable technologies that may be used with the electrically-conductive shaft 364 could be, for example, Ultra-wide band (UWB) and Terahertz technologies. Accordingly, embodiments of vascular access devices having an electrically-conductive shaft (e.g. shaft 364) could enable real-time position determination and monitoring during medical procedures such as catheter insertion.

Figure 26:
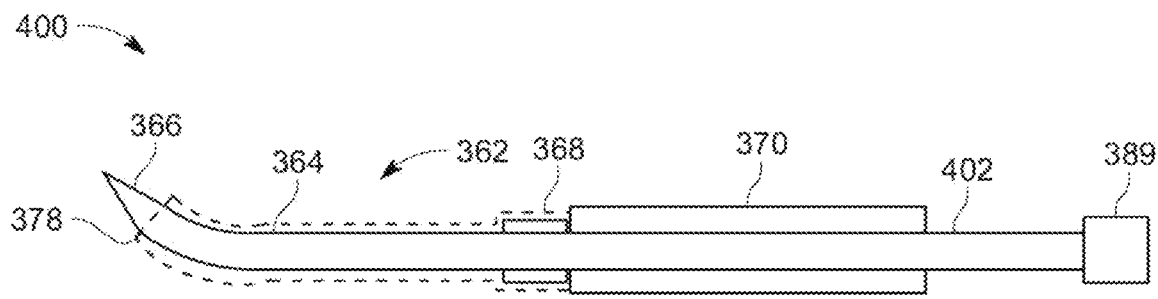
FIG. 26 shows a side partial cross-sectional view of a vascular access device 400 in accordance with another embodiment of the present disclosure.

FIG. 26 shows a side partial cross-sectional view of a vascular access device 400 in accordance with another embodiment of the present disclosure. In this embodiment, the vascular access device 400 includes many of the same features and components as the vascular access device 360 described above and shown in FIGS. 23-25. For the sake of brevity, only new or different aspects of the vascular access device 400 will be described. In this embodiment, the connector 389 has been removed from the housing 370, and is now connected to the shaft 364 of the curved introducer 362 via a conductive lead 402 in a configuration that may be referred to as a pigtail connector. In some embodiments, the connector 389 may be coupled to other suitable connectors or components for performing a medical procedure, such as the optical analysis system 260 (FIG. 14), a camera or other visualization system, or any other suitable components.

Figure 27:
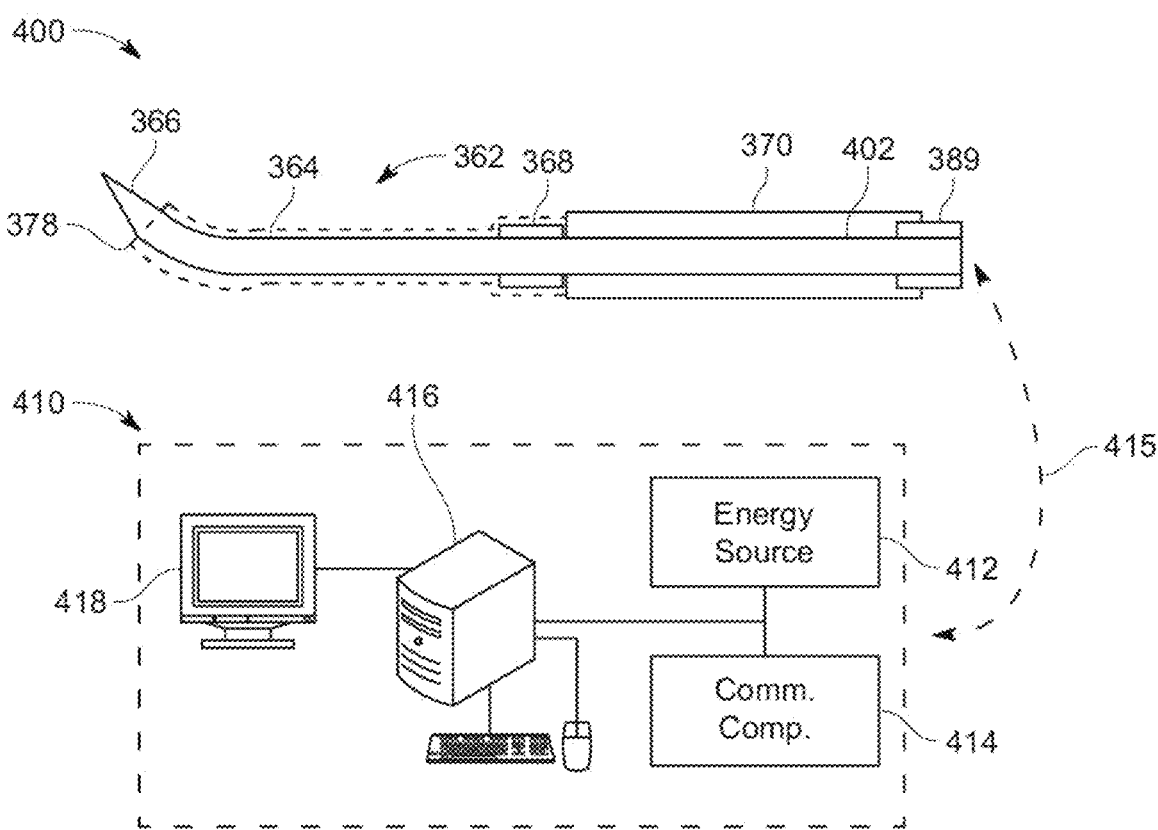
FIG. 27 shows a side partial cross-sectional view of the vascular access device of FIG. 26 in another use configuration in accordance with an embodiment of the present disclosure.

For example, FIG. 27 shows a side partial cross-sectional view of the vascular access device 400 of FIG. 26 in another use configuration in accordance with an embodiment of the present disclosure. In some embodiments, the conductive lead 402 may be withdrawn into the housing 370 of the vascular access device 400 so that the connector 389 is disposed at the end of the housing 370. In some embodiments, the connector 389 may be removably coupled from the housing 370 (e.g. as depicted in FIG. 26).

In some embodiment the connector 389 may be operatively coupled (e.g. physically, wirelessly, etc.) to an analysis system 410 by communication link 415. In some embodiments, the analysis system 410 may include an energy source 412 for providing energy (e.g. light, IR, UV, UWB, electricity, etc.) to the conductive lead 402 via a communication component 414 (e.g. transceiver) that transmits energy to or receives energy from (or both) the vascular access device 400. In some embodiments, the analysis system 410 includes a processing and control module 416 that controls the other components of the analysis system 410 and processes and analyzes the signals (e.g. reflected energy) received back from the vascular access device 400, and a display 418 that provides a visual display of the analysis results from the processing and control module 416. The analysis system 410 may be generally known and a variety of suitable systems are commercially available for use in medical applications.

Figure 28:
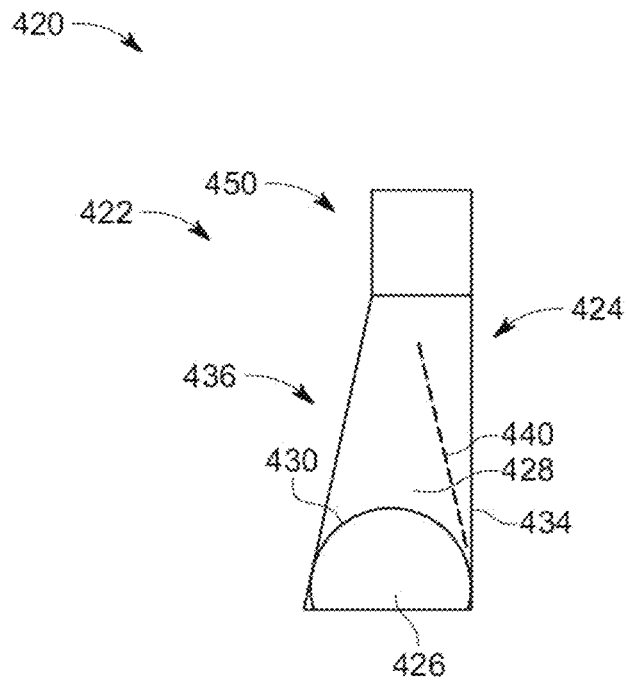
FIG. 28 is a side partial cross-sectional view of a forming system for forming a curved introducer in accordance with an embodiment of the present disclosure.
Figure 29:
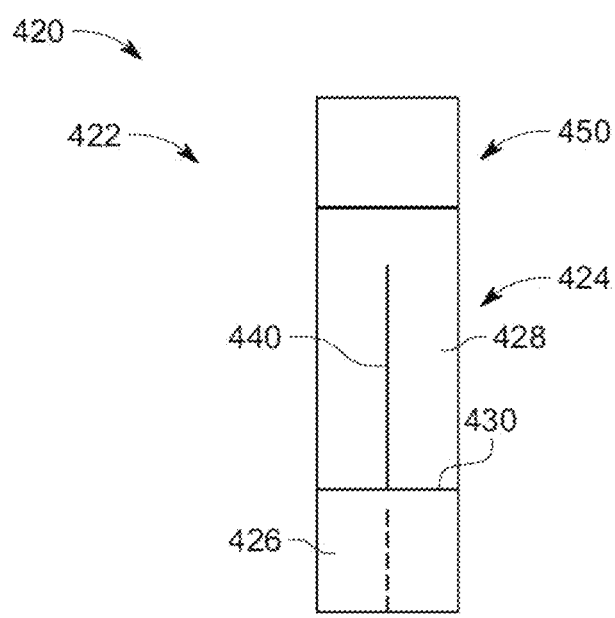
FIG. 29 is an end partial cross-sectional view of the forming system of FIG. 28 in accordance with an embodiment of the present disclosure.
Figure 30:
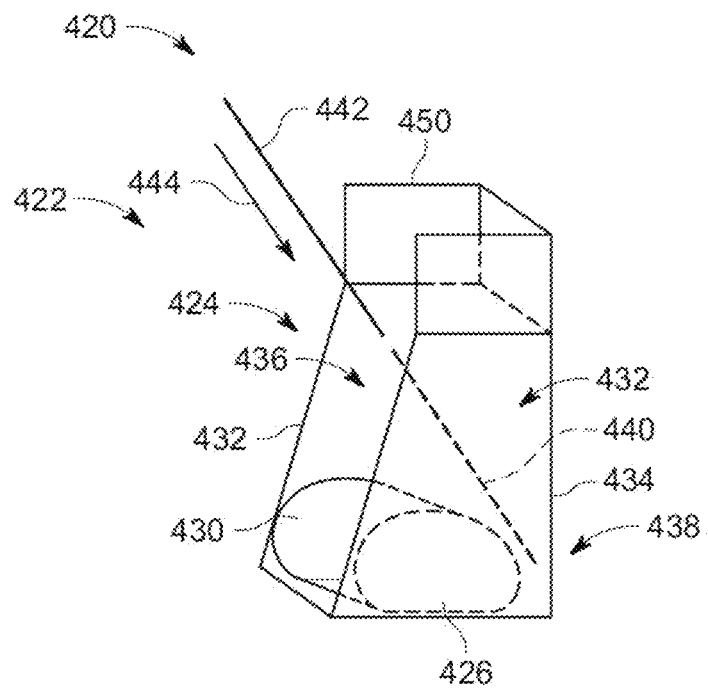
FIG. 30 is a perspective partial cross-sectional view of the forming system of FIG. 28 in accordance with an embodiment of the present disclosure.
Figure 31:
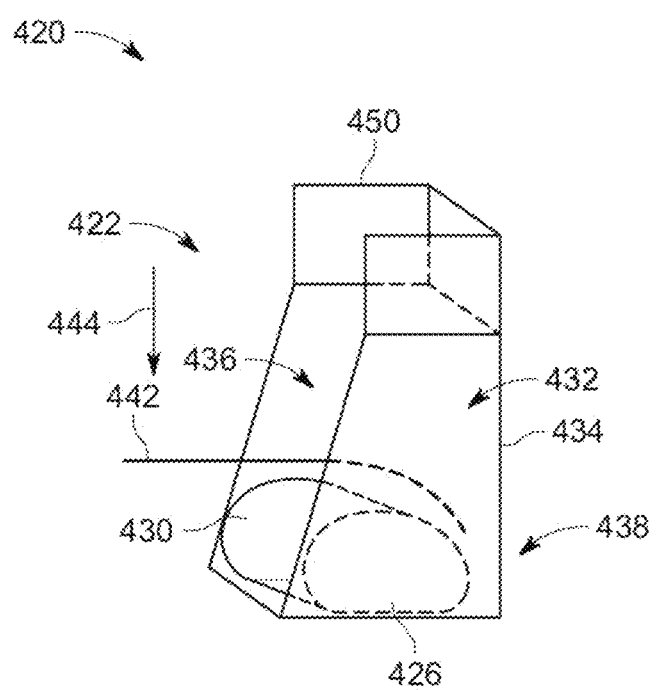
FIG. 31 is a side partial cross-sectional view of the forming system of FIG. 28 integrated with a case for vascular access devices in accordance with another embodiment of the present disclosure.

FIG. 28 is a side partial cross-sectional view of a forming system 420 for forming a curved introducer (e.g. curved introducer 102) in accordance with an embodiment of the present disclosure. FIGS. 29 and 30 are end and perspective views of the forming system 420 of FIG. 28. In some embodiments, the forming system 420 includes a forming tool 422 having a first portion 450, a second portion 424, and a third portion 426 collectively creating an open face forming channel 428. As best shown in FIGS. 28 and 29, in some embodiments, the forming channel 428 may be defined by a forming surface 430 of the third portion 426, sidewall surfaces 432 and back side 434 extending between the first portion 450 and the third portion 426. In some embodiments, the forming system 420 has an entrance aperture 436 disposed on the face of the forming channel 428.

It will be appreciated that the forming surface 430 of the third portion 426 may be a curved or arcuate surface having one or more curved contours at various angles that are generally designed to provide a desirable amount of curvature to a curved introducer that is being created using the forming system 420. For example, in some embodiments, the forming surface 430 of the third portion 426 in the forming channel 428 may be configured to provide a specific curved introducer intended for a specific use configuration or functionality, such as to provide an angiocath of an intravenous application to create a curved introducer with a desired value of smooth curvature in the distal third of the angiocath (e.g. introducer angle β of approximately 15 degrees).

In some embodiments, such as when the forming system 420 is used for forming a curved introducer having a hollow, internal passage (e.g. passage 125 of FIGS. 4-5), the forming system 420 may further include an integrated internal forming mandrel 440. In some embodiments, the forming mandrel 440 may be formed of a suitable bendable material, such as, for example, a metal wire, a plastic shaft, nitinol, or other suitably bendable material. In some embodiments, however, such as when the forming system 420 is used for forming a curved introducer having a solid shaft (e.g. curved introducer 362 of FIGS. 23-25), the forming mandrel 440 may be unnecessary and may be eliminated.

In some embodiments, such as when the forming system 420 is used for forming a curved introducer having a hollow, internal passage (e.g. passage 125 of FIGS. 4-5), the forming system 420 may further include a flexible hollow spring-like forming funnel mandrel with a funnel entrance 464 coupled to a forming sheath 466 (FIG. 32-34) matched to the gauge of the catheter-encased introducer needle. The entrance of the funnel mandrel 464 may facilitate easy access for a clinician to insert the hollow introducer into the forming tool 422.

Figure 32:
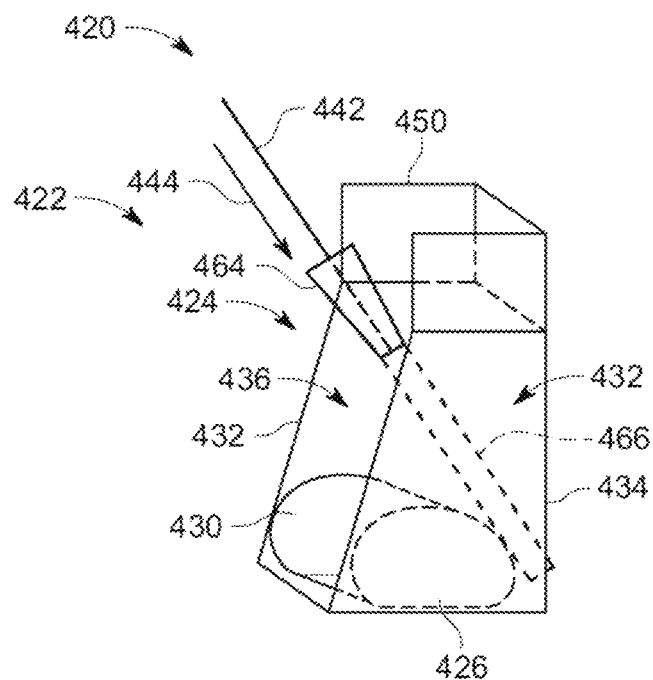
FIG. 32 is an end partial cross-sectional view of the case with the integrated forming system of FIG. 31 in accordance with another embodiment of the present disclosure.
Figure 33:
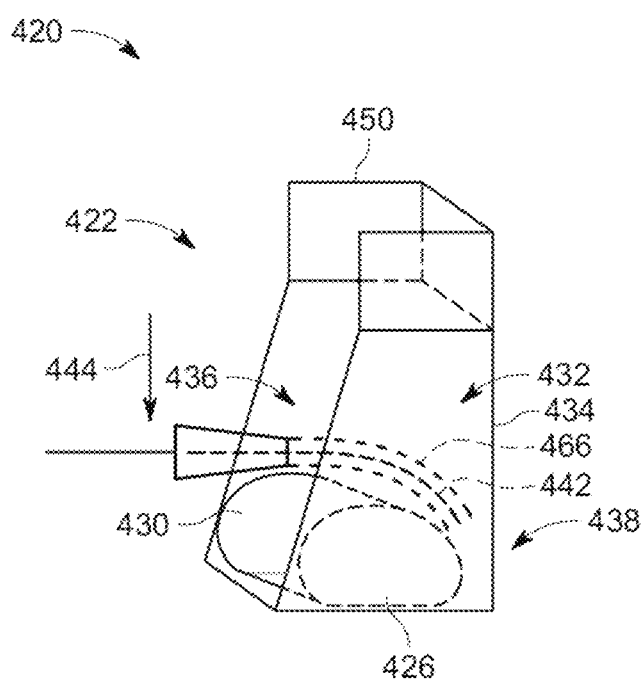
FIG. 33 is a perspective partial cross-sectional view of the case with the integrated forming system of FIG. 31 in accordance with another embodiment of the present disclosure.

In operation, a user (e.g. a medical practitioner, fabricator, or other suitable person) may take an initially straight workpiece 442, such as a conventional needle having a straight, hollow bore shaft (e.g. needle 52 of FIGS. 1-3B having internal passage 125), and may insert it over the internal forming mandrel 440 as indicated by arrow 444 (FIG. 30) or into the external forming funnel mandrel 464 (FIG. 32). Alternately, if the workpiece 442 is a solid shaft workpiece, then the forming mandrel 440 is not used. The user may then insert a distal end or tip of the workpiece into the entrance aperture 436 of the forming channel 428. In some embodiments, the tip of the workpiece 442 may have a beveled surface (e.g. beveled surface 70 of FIG. 2), and the user may orient the workpiece 442 to provide a curved introducer having the beveled surface facing generally upward (e.g. FIGS. 4-5) or facing generally downward (e.g. FIGS. 18-19) as described above. The user may then apply sufficient force to advance the workpiece 442 (over mandrel 440 of FIG. 30 or into mandrel 464 of FIG. 32) into the forming channel 428 and into engagement with the forming surface 430 of the third portion 426 of the forming tool 422. As the tip of the workpiece 442 is advanced into the forming channel 428, and force is applied (arrow 444), the forming surface 430 causes the workpiece 442 to bend by the desired amount of curvature to form a curved introducer (e.g. curved introducer 102 of FIGS. 3A-5). During the forming of the curved introducer, the forming mandrels 440, 464 may provide support to the workpiece 442 to prevent undesirable shaping of the internal passage of the workpiece 442, such a relatively sharp bends, kinks, or other dramatic shape changes that may be undesirable to the operability of the curved introducer. After the workpiece 442 is advanced through the forming channel 428 to provide a desired amount of curvature to the curved introducer, the resultant curved introducer may be removed from the forming channel 428 through the entrance aperture 436.

In some embodiments, the forming system 420 may be an off-the-shelf accessory and may come with one or more workpieces to mate with multiple variable sized forming surfaces 430 of the third portion 426. For example, in some embodiments, such a kit may include a plurality of workpieces, each of the workpieces having a particular length associated with a particular operating environment or use scenario.

Similarly, in some embodiments, the forming system 420 may be an integral part of a larger device or apparatus such as the vascular access device 50 depicted in FIGS. 1-2 by removably coupling the first portion 450 of the forming system 420 to the needle hub 58 or the housing 60. In some embodiments, the forming system 420 may disconnect from the vascular access device at the first portion 450 for performing the above-described forming operations to create the desired curved introducer. And in some embodiments, the forming system 420 may be reconnected with the vascular access device at the first portion 450 after use, which may be desirable for various reasons (e.g. safety reasons post PIVC insertion, convenience, etc.).

Figure 34:
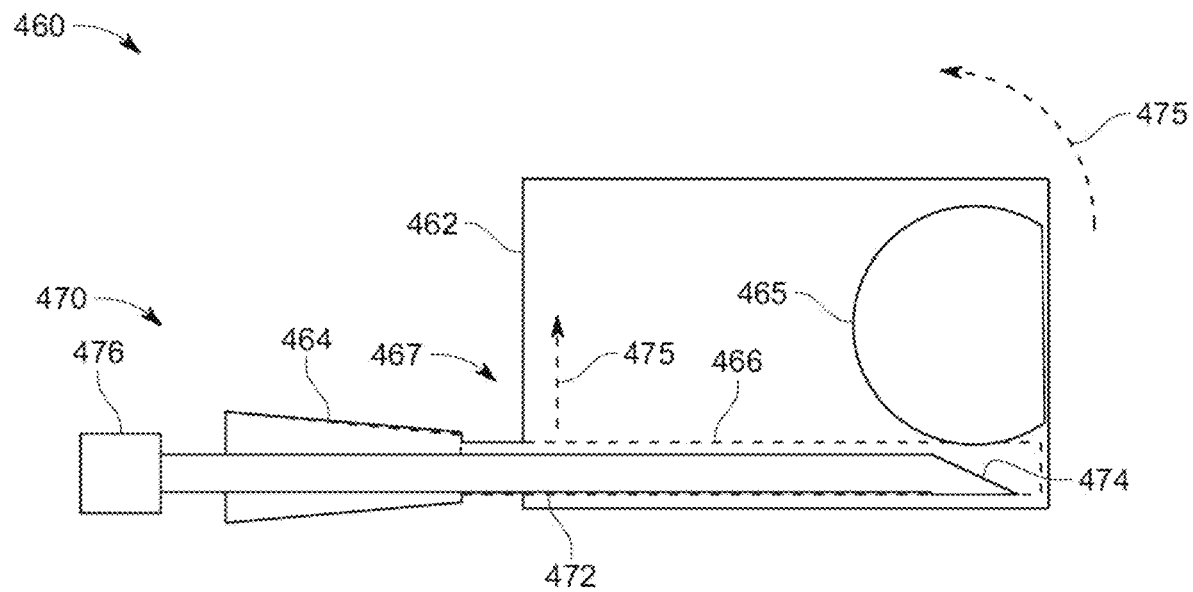
FIG. 34 is a side partial cross-sectional view of a forming system for forming a curved introducer in accordance with another embodiment of the present disclosure.

FIG. 34 is a side partial cross-sectional view of a forming system 460 for forming a curved introducer in accordance with another embodiment of the present disclosure. In some embodiments, the forming system 460 includes a forming housing 462 having an entry 464 leading to a flexible forming sheath 466 that is configured to receive a workpiece 470. The forming system 460 also includes a forming surface 465 disposed within the forming housing 462 proximate to the forming sheath 466. As shown in FIG. 34, in some embodiments, the workpiece 470 includes a straight shaft 472 (e.g. a straight needle 52 of FIGS. 1-2) having a beveled tip 474, and the shaft 472 may be coupled to a hub 476 (e.g. needle hub 58 of FIG. 1). As described above, the hub 476 may be configured to be coupled to a catheter hub (e.g. catheter hub 114 of FIG. 3A) of a catheter (e.g. catheter 112 of FIG. 3A).

In operation, a user (e.g. medical practitioner, technician, etc.) inserts the workpiece 470 into the entry 464 of the forming sheath 466, positioning the shaft 472 within the forming sheath 466 with the beveled tip 474 proximate to the forming surface 465. The user may choose to position the beveled tip 474 facing up (with the beveled surface proximate the forming surface 465 as shown in FIG. 34) or facing down (or any other suitable direction) depending on the preference of the user. The user may then rotate the forming housing 462 (as indicated by the rotation arrow 475), bringing the forming surface 465 into engagement with the shaft 472 of the workpiece 470. During the rotation of the forming housing 462, the forming sheath 466 and the workpiece 470 within are free to move within an opening 467 (e.g. a slot) disposed within the forming housing 462 (as indicated by arrow 475) so that the shaft 472 of the workpiece 470 becomes engaged with the forming surface 465 of the forming housing 462. As the user applies force to the forming housing 462, the shaft 472 of the workpiece 470 conforms to the shape of the forming surface 465 within the forming housing 462. After the desired shape has been achieved, the user releases the force on the forming housing 462 and withdraws the resultant curved introducer from the forming sheath 466, thereby providing the desired curved introducer for use in a medical procedure. In some embodiments, the forming sheath 466 is anchored within the forming housing 462 of the forming system 460 so that it does not have to be held by the user, and remains in position for the next forming operation.

Based on the foregoing disclosure, it will be appreciated that in some embodiments, a vascular access device configured for introduction of a catheter into a blood vessel of a patient, comprises: a housing; and an introducer hub operatively coupled to the housing and to a curved introducer, the curved introducer having a shaft that includes a tip disposed at a distal end of the shaft, the tip configured to penetrate at least a proximal wall of the blood vessel of the patient, the shaft having a straight section and a curved section disposed between the straight section and the tip, the curved section being configured to provide a curvature between the straight section and the tip such that a tip longitudinal axis that extends from the tip forms an introducer angle with a straight longitudinal axis of the straight section, the introducer angle being configured to at least partially reduce contact by the tip with a distal wall of the blood vessel after the tip has been inserted through the proximal wall of the blood vessel.

In addition, in some embodiments, a vascular access device configured for introduction of a medical instrument, comprises: a curved introducer having a shaft that includes a tip disposed at a distal end of the shaft, the tip configured to penetrate at least a proximal wall of a blood vessel of a patient, the shaft having a straight section and a curved section disposed between the straight section and the tip, the curved section being configured to provide a curvature between the straight section and the tip such that a tip longitudinal axis that extends from the tip forms an introducer angle with a straight longitudinal axis of the straight section, the introducer angle being configured to at least partially reduce contact by the tip with a distal wall of the blood vessel after the tip has been inserted through the proximal wall of the blood vessel.

In some embodiments, the introducer angle provided by the curved section is configured to approximately align the tip longitudinal axis with a vessel longitudinal axis of the blood vessel after the tip has been inserted through the proximal wall of the blood vessel. And in some embodiments, the introducer hub is configured to enable retraction of the curved introducer into the housing. In some embodiments, the introducer angle provided by the curved section is configured to approximately align the tip longitudinal axis with a vessel longitudinal axis of the blood vessel so that as a distal end of a catheter is advanced past the tip of the curved introducer, a catheter axis of the catheter is approximately parallel with the vessel longitudinal axis.

And in some embodiments, the introducer angle is within a range of approximately five degrees to approximately forty-five degrees, inclusive. In some embodiments, the introducer angle is within a range of approximately fifteen degrees to approximately thirty degrees, inclusive.

In some embodiments, the curved section is disposed within a distal thirty percent of a length of the shaft of the curved introducer. And in some embodiments, the curvature of the curved section causes the tip disposed at the distal end of the shaft to extend beyond a cylindrical outer boundary that represents an imaginary extension of the straight section of the shaft.

In further embodiments, the shaft defines a passage extending from a proximal end of the shaft to the tip, the passage being configured to permit a fluid flow through the curved introducer. And in some embodiments, the shaft further includes a blood viewing aperture disposed therein in fluidic communication with the passage for permitting visual observation of a fluid in the passage following insertion of the tip through the proximal wall of the blood vessel.

In addition, in some embodiments, a vascular access device configured for introduction of a catheter into a blood vessel of a patient, comprises: a housing; an introducer hub operatively coupled to the housing and to a curved introducer, the curved introducer having a shaft that includes a tip disposed at a distal end of the shaft, the tip configured to penetrate at least a proximal wall of the blood vessel of the patient, the shaft having a straight section and a curved section disposed between the straight section and the tip, the curved section being configured to provide a curvature between the straight section and the tip such that a tip longitudinal axis that extends from the tip forms an introducer angle with a straight longitudinal axis of the straight section, the introducer angle being configured to at least partially reduce contact by the tip with a distal wall of the blood vessel after the tip has been inserted through the proximal wall of the blood vessel; a catheter disposed about at least a portion of the curved introducer, the catheter having a distal end positioned proximate to the tip of the curved introducer; and a catheter hub operatively coupled to the catheter and removably coupled to the introducer hub.

In some embodiments, the introducer angle provided by the curved section is configured to approximately align the tip longitudinal axis with a vessel longitudinal axis of the blood vessel after the tip has been inserted through the proximal wall of the blood vessel. And in some embodiments, the introducer hub is configured to enable retraction of the curved introducer into the housing.

In addition, in some embodiments, curvature of the curved section causes the tip disposed at the distal end of the shaft to extend beyond a cylindrical outer boundary that represents an imaginary extension of the straight section of the shaft. And in some embodiments, the introducer angle provided by the curved section is configured to approximately align the tip longitudinal axis with a vessel longitudinal axis of the blood vessel so that as the distal end of the catheter is advanced past the tip of the curved introducer, a catheter axis of the distal end of the catheter is approximately parallel with a vessel longitudinal axis of the blood vessel.

In further embodiments, the introducer angle provided by the curved section is configured to enable the distal end of the catheter to advance into the blood vessel at a location spaced apart from a distal wall of the blood vessel as the distal end of the catheter is advanced past the tip of the curved introducer. And in some embodiments, the introducer angle provided by the curved section is configured to enable the distal end of the catheter to advance into the blood vessel along a vessel longitudinal axis of the blood vessel without impinging a distal wall of the blood vessel as the distal end of the catheter is advanced past the tip of the curved introducer.

In addition, in some embodiments, the introducer angle provided by the curved section is configured to at least partially reduce a likelihood that the distal end of the catheter will impinge a distal wall of the blood vessel as the distal end of the catheter is advanced past the tip of the curved introducer. In some embodiments, the introducer hub is configured to be removed from the catheter hub to withdraw the curved introducer from the catheter. And in some embodiments, the shaft defines a passage extending from a proximal end of the shaft to the tip, the passage being configured to permit a fluid flow through the curved introducer. In some embodiments, the shaft further includes a blood viewing aperture disposed within the straight section, the blood viewing aperture being in fluidic communication with the passage for permitting visual observation of a fluid in the passage following insertion of the tip through the proximal wall of the blood vessel.

In addition, in some embodiments, a vascular access device may further include a catheter disposed about at least a portion of the curved introducer, and a catheter hub operatively coupled to the catheter and removably coupled to the introducer hub. And in some embodiments, the introducer angle provided by the curved section is configured to approximately align the tip longitudinal axis with a vessel longitudinal axis of the blood vessel so that as a distal end of the catheter is advanced past the tip of the curved introducer, a catheter axis of the catheter is approximately parallel with the vessel longitudinal axis and spaced apart from the endothelial lining of the vasculature.

In some embodiments, the introducer hub is configured to be removed from the catheter hub to withdraw the curved introducer from the catheter. And in some embodiments, the shaft defines a passage extending from a proximal end of the shaft to the tip, the passage being configured to permit a fluid flow through the curved introducer. In some other embodiments, the shaft comprises a solid shaft from a proximal end of the shaft to the tip.

In the foregoing description, many specific details of certain implementations are described and shown in the accompanying figures. One skilled in the art will understand that the present disclosure may have other possible implementations, and that such other implementations may be practiced with or without some of the particular details set forth in the foregoing description. In addition, it will be appreciated that although various aspects may be described in a particular order, or with respect to certain figures or certain embodiments, it should be appreciated that such aspects may be variously combined or re-ordered to create alternate implementations that remain consistent with the scope of the present disclosure and the claims set forth below.

The foregoing examples are meant to be illustrative only, and omission of an example here should not be construed as intentional or intentionally disavowing subject matter. The scope of the invention set forth herein is defined solely by the following claims at the end of this application.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Throughout this application, examples and lists are given, and these examples and/or lists may be delineated with parentheses, commas, the abbreviation "e.g.," or some combination thereof. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Although one or more users may be shown and/or described herein, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Throughout this application, the terms "in an embodiment," "in at least some embodiments," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A vascular access device configured for introduction of a catheter into a blood vessel of a patient, comprising:
    an introducer having a shaft that includes a tip disposed at a distal end of the shaft, the tip configured to penetrate at least a skin and a proximal wall of the blood vessel of the patient, the shaft having a first aperture disposed proximate to the distal end, and a second aperture spaced apart from the distal end;
    an optical fiber disposed within the shaft and configured to convey light through the shaft for emission from the first aperture and the second aperture; and
    the catheter disposed about at least a portion of the introducer, the catheter having a catheter distal end positioned between the first aperture and the second aperture such that as the tip and the first aperture are advanced into the blood vessel, a first intensity of light emitted through the first aperture and visible from outside the patient is diminished, and as the catheter distal end and the second aperture are advanced into the blood vessel, a second intensity of light emitted through the second aperture and visible from the outside the patient is diminished.

2. The vascular access device of claim 1, wherein the shaft includes a straight section and a curved section, the curved section being disposed between the straight section and the tip, the first aperture being disposed within the curved section and the second aperture being disposed within the straight section.

3. The vascular access device of claim 2, wherein the curved section being configured to provide a curvature between the straight section and the tip such that a tip longitudinal axis that extends from the tip forms an introducer angle with a straight longitudinal axis of the straight section, the introducer angle being configured to at least partially reduce contact by the tip with a distal wall of the blood vessel after the tip has been inserted through the proximal wall of the blood vessel.

4. The vascular access device of claim 3, wherein the introducer angle provided by the curved section is configured to approximately align the tip longitudinal axis with a vessel longitudinal axis of the blood vessel after the tip has been inserted through the proximal wall of the blood vessel.

5. The vascular access device of claim 3, wherein the introducer angle provided by the curved section is configured to approximately align the tip longitudinal axis with a vessel longitudinal axis of the blood vessel so that as the distal end of the catheter is advanced past the tip of the introducer, a catheter axis of the distal end of the catheter is approximately parallel with the vessel longitudinal axis of the blood vessel.

6. The vascular access device of claim 1, further comprising:
a housing configured to be grasped by a human hand; and
an introducer hub operatively coupled to the introducer and to the housing.

7. The vascular access device of claim 6, further comprising:
a catheter hub operatively coupled to the catheter and removably coupled to the introducer hub.

8. The vascular access device of claim 7, wherein the introducer hub is configured to be removed from the catheter hub to withdraw the introducer from the catheter.

9. The vascular access device of claim 6, wherein the introducer hub is configured to enable retraction of the introducer into at least one of the housing or the introducer hub.

10. The vascular access device of claim 1, further comprising a light source for providing the light into the optical fiber.

11. A vascular access device configured for introducing a catheter into a blood vessel of a patient, comprising:
an introducer having a shaft that includes a tip configured to penetrate at least a skin and a proximal wall of the blood vessel of the patient, the shaft having a first aperture disposed proximate to the tip, and a second aperture spaced apart from the tip;
an optical fiber disposed within the shaft that conveys light for emission from the first aperture and the second aperture; and
a catheter disposed about the introducer and having the catheter distal end positioned between the first aperture and the second aperture such that as the first aperture is advanced into the blood vessel, a first intensity of light emitted through the first aperture and visible from outside the patient is diminished, and as the second aperture is advanced into the blood vessel, a second intensity of light emitted through the second aperture and visible from the outside the patient is diminished.

12. The vascular access device of claim 11, wherein the shaft includes a straight section and a curved section, the curved section being disposed between the straight section and the tip, the first aperture being disposed within the curved section and the second aperture being disposed within the straight section.

13. The vascular access device of claim 12, wherein the curved section provides a curvature between the straight section and the tip such that a tip longitudinal axis that extends from the tip forms an introducer angle with a straight longitudinal axis of the straight section, the introducer angle being configured to at least partially reduce contact by the tip with a distal wall of the blood vessel after the tip has been inserted through the proximal wall of the blood vessel.

14. The vascular access device of claim 13, wherein the introducer angle is configured to approximately align the tip longitudinal axis with a vessel longitudinal axis of the blood vessel after the tip has been inserted through the proximal wall of the blood vessel.

15. The vascular access device of claim 13, wherein the introducer angle provided by the curved section is configured to approximately align the tip longitudinal axis with a vessel longitudinal axis of the blood vessel so that as the distal end of the catheter is advanced past the tip of the introducer, a catheter axis of the distal end of the catheter is approximately parallel with the vessel longitudinal axis of the blood vessel.

16. A method of introducing a catheter into a blood vessel of a patient, comprising:
providing an introducer having a shaft that includes a tip disposed at a distal end of the shaft, the shaft having a first aperture disposed proximate to the distal end, and a second aperture spaced apart from the distal end;
providing the catheter disposed about at least a portion of the shaft of the introducer, the catheter having a catheter distal end positioned between the first aperture and the second aperture;
providing light through an optical fiber disposed within the shaft such that at least some light is emitted outwardly from the first aperture and the second aperture;
penetrating a skin of the patient with the tip of the introducer;
engaging the tip of the introducer with a proximal wall of the blood vessel;
advancing the tip into the blood vessel;
determining that the tip and the first aperture have advanced into the blood vessel when a first intensity of light emitted through the first aperture and visible from outside the patient is diminished; and
determining that the catheter distal end and the second aperture have advanced into the blood vessel when a second intensity of light emitted through the second aperture and visible from the outside the patient is diminished.

17. The method of claim 16, the shaft including a straight section and a curved section, the curved section being disposed between the straight section and the tip, the first aperture being disposed within the curved section and the second aperture being disposed within the straight section.

18. The method of claim 16, further comprising providing a light source for providing the light into the optical fiber.

19. The method of claim 16, further comprising: after determining that the catheter distal end and the second aperture have advanced into the blood vessel, advancing the catheter along the introducer such that the catheter distal end advances past the distal end of the tip of the introducer and into the blood vessel.

20. The method of claim 16, further comprising: after determining that the catheter distal end and the second aperture have advanced into the blood vessel, advancing the catheter along the introducer such that the catheter distal end advances past the distal end of the tip of the introducer approximately along a vessel longitudinal axis of the blood vessel.

* * * * *